(12) United States Patent
Kato

(10) Patent No.: US 8,857,007 B2
(45) Date of Patent: Oct. 14, 2014

(54) VEHICLE WIPER DEVICE

(71) Applicant: ASMO CO., Ltd., Shizuoka-ken (JP)

(72) Inventor: Atsushi Kato, Toyohashi (JP)

(73) Assignee: Asmo Co., Ltd., Shizuoka-ken (JP)

( * ) Notice: Subject to any disclaimer, the term of this patent is extended or adjusted under 35 U.S.C. 154(b) by 0 days.

(21) Appl. No.: 13/831,607

(22) Filed: Mar. 15, 2013

(65) Prior Publication Data

US 2013/0269138 A1     Oct. 17, 2013

(30) Foreign Application Priority Data

Mar. 21, 2012  (JP) .................................. 2012-063951
Sep. 7, 2012   (JP) .................................. 2012-197688
Sep. 11, 2012  (JP) .................................. 2012-199733

(51) Int. Cl.
*B60S 1/34*     (2006.01)
*B60S 1/16*     (2006.01)
*B60S 1/24*     (2006.01)
*B60S 1/08*     (2006.01)

(52) U.S. Cl.
CPC .................. *B60S 1/16* (2013.01); *B60S 1/3436* (2013.01); *B60S 1/3465* (2013.01); *B60S 1/245* (2013.01); *B60S 1/3459* (2013.01); *B60S 1/0814* (2013.01)
USPC .................. 15/250.31; 15/250.19; 15/250.34; 15/250.352; 15/250.14

(58) Field of Classification Search
CPC ............ B60S 1/34; B60S 1/16; B60S 1/3465; B60S 1/3436; B60S 1/3459; B60S 1/3454; B60S 1/3468
USPC ............. 15/250.3, 250.31, 250.351, 250.352, 15/250.21, 250.19, 250.202, 250.203, 15/250.14
See application file for complete search history.

(56) References Cited

U.S. PATENT DOCUMENTS 6,640,381 B1 * 11/2003 Zimmer .................... 15/250.352
8,104,135 B2    1/2012 Matsumoto et al.

FOREIGN PATENT DOCUMENTS

JP        2008-273239 A     11/2008

* cited by examiner

*Primary Examiner* — Gary Graham
(74) *Attorney, Agent, or Firm* — Christensen Fonder P.A.

(57) ABSTRACT

A vehicle wiper device includes a drive device, a drive shaft rotated back and forth about a first axis by the drive device, a wiper arm pivoted back and forth along a wiping surface as the drive shaft rotates back and forth, and a wiper arm biasing mechanism that biases the wiper arm toward the wiping surface. The wiper arm biasing mechanism includes a swing member, a tilting member, and a biasing member. The swing member is integrally pivotal with the drive shaft. The tilting member is supported by the swing member so as to tilt about a second axis. The tilting member includes a wiper fixing portion. The biasing member, which includes a first end supported by the swing member, and applies a biasing force to the tilting member.

20 Claims, 15 Drawing Sheets

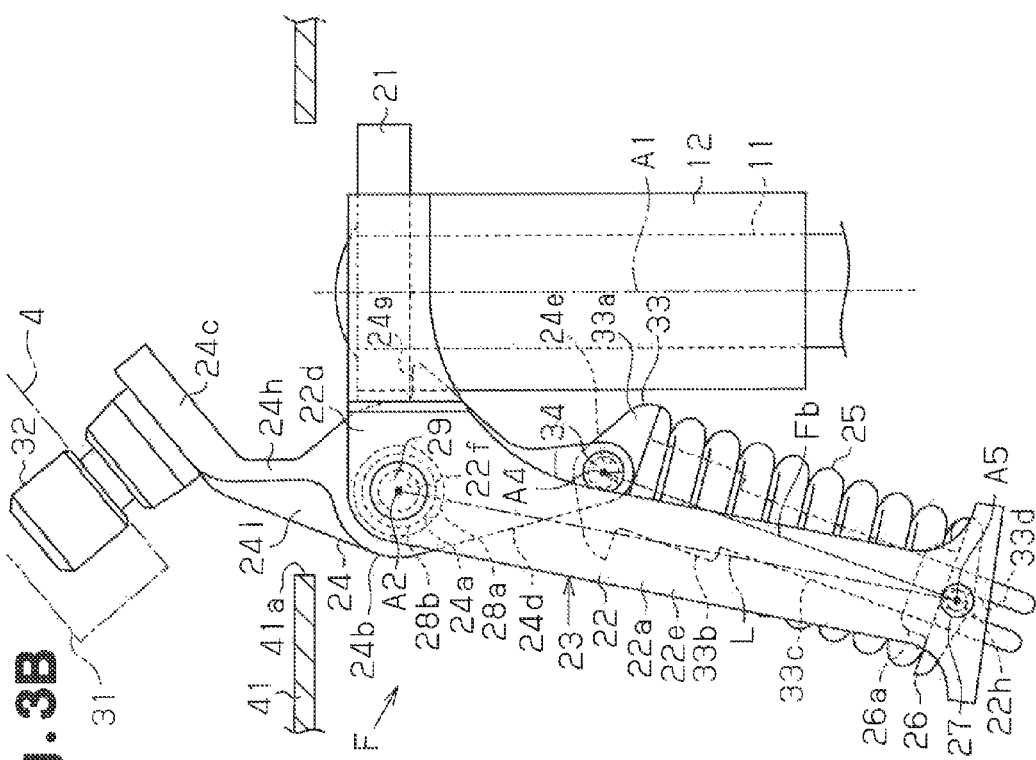
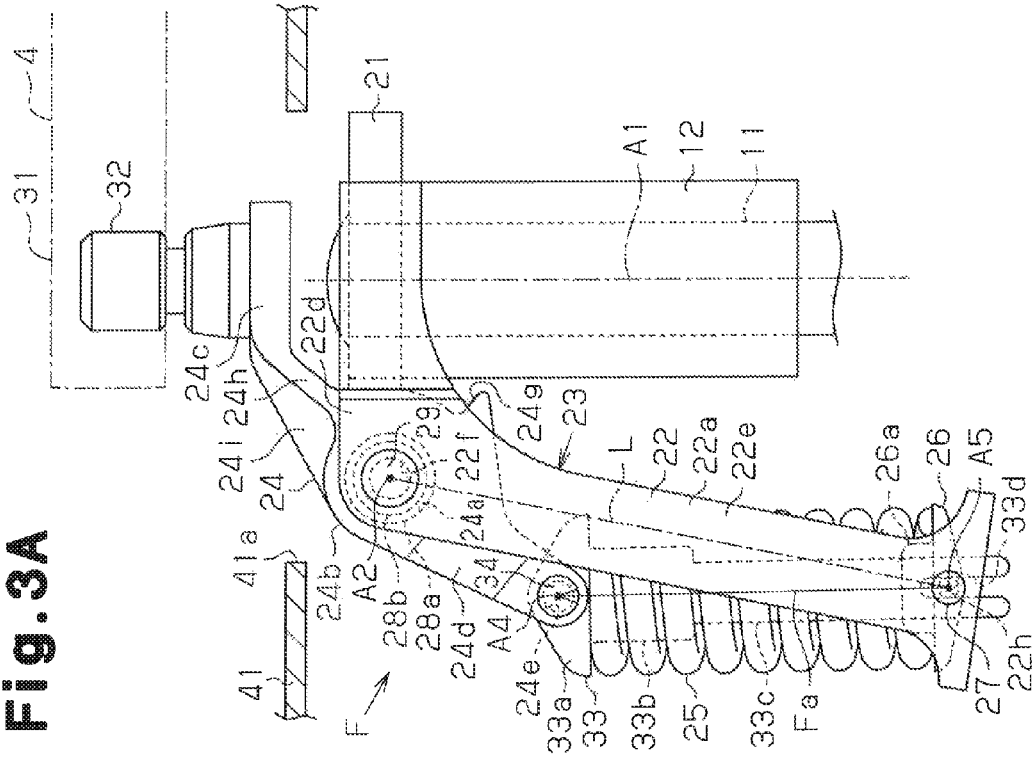

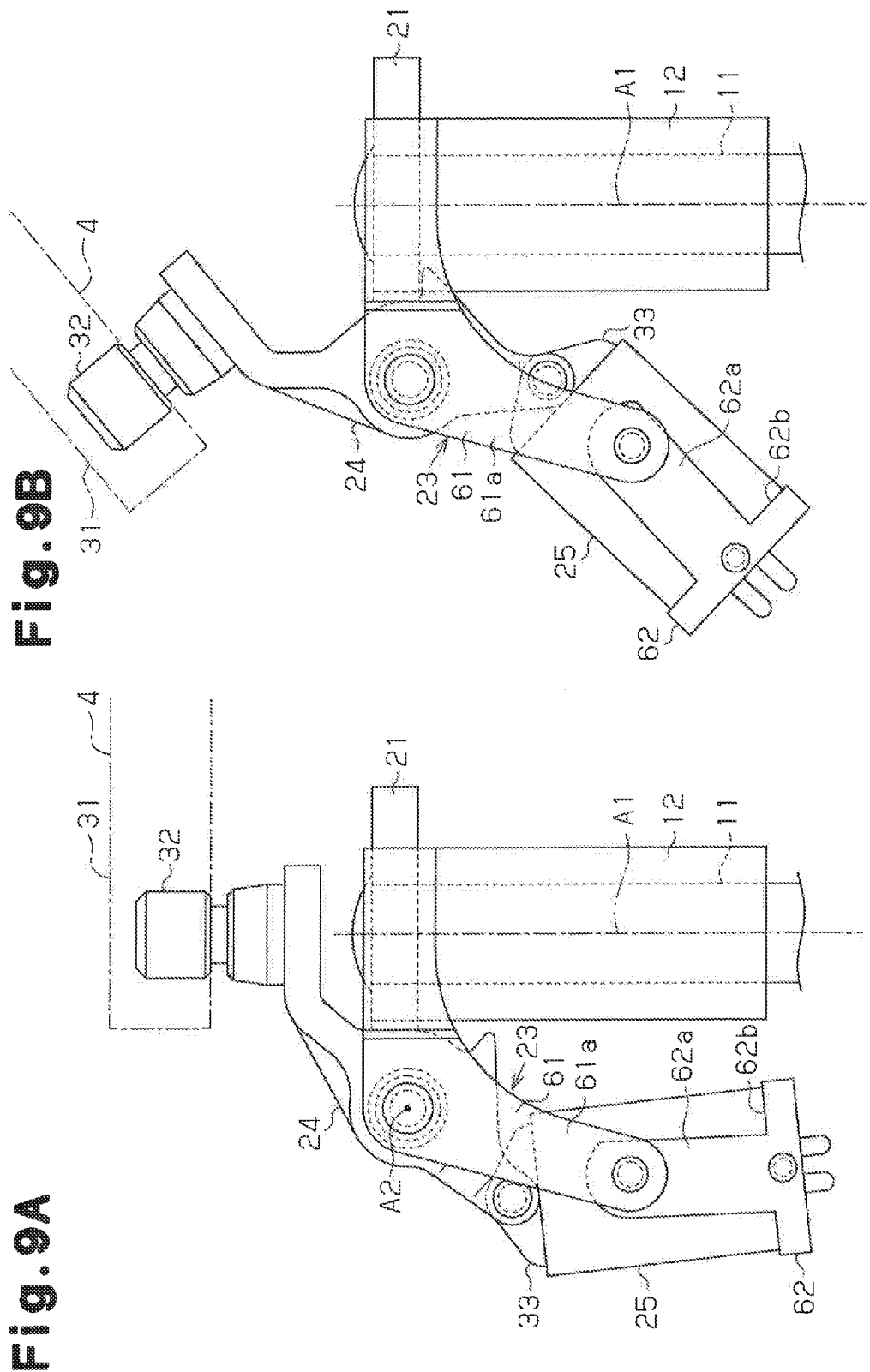

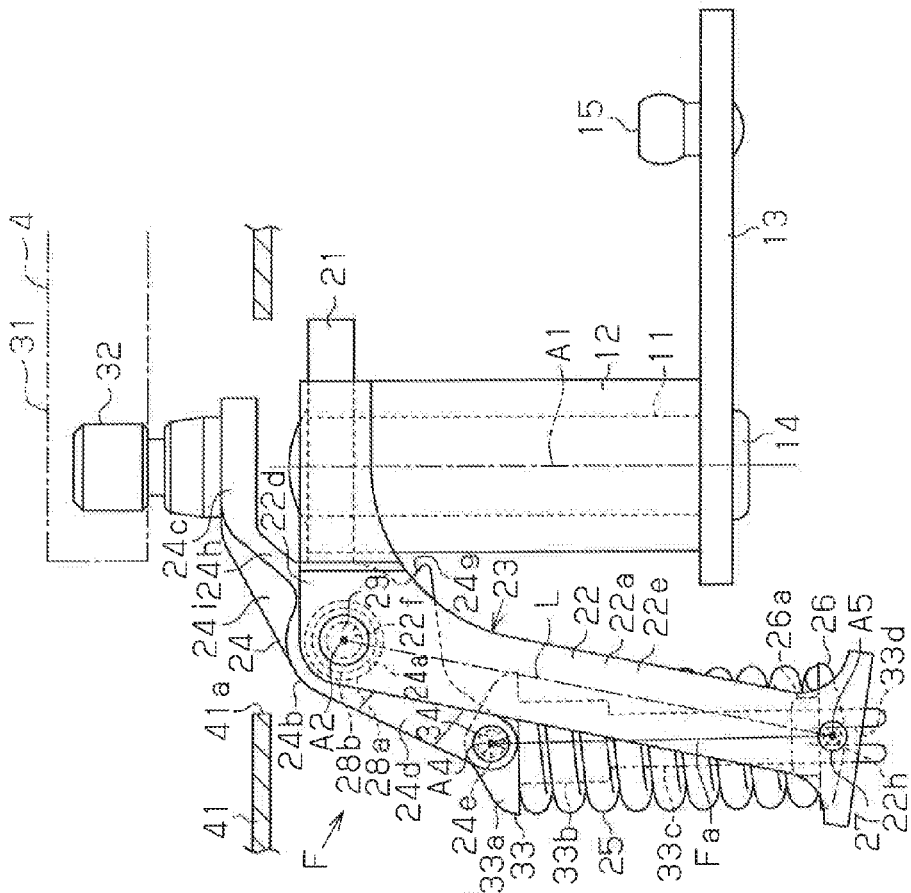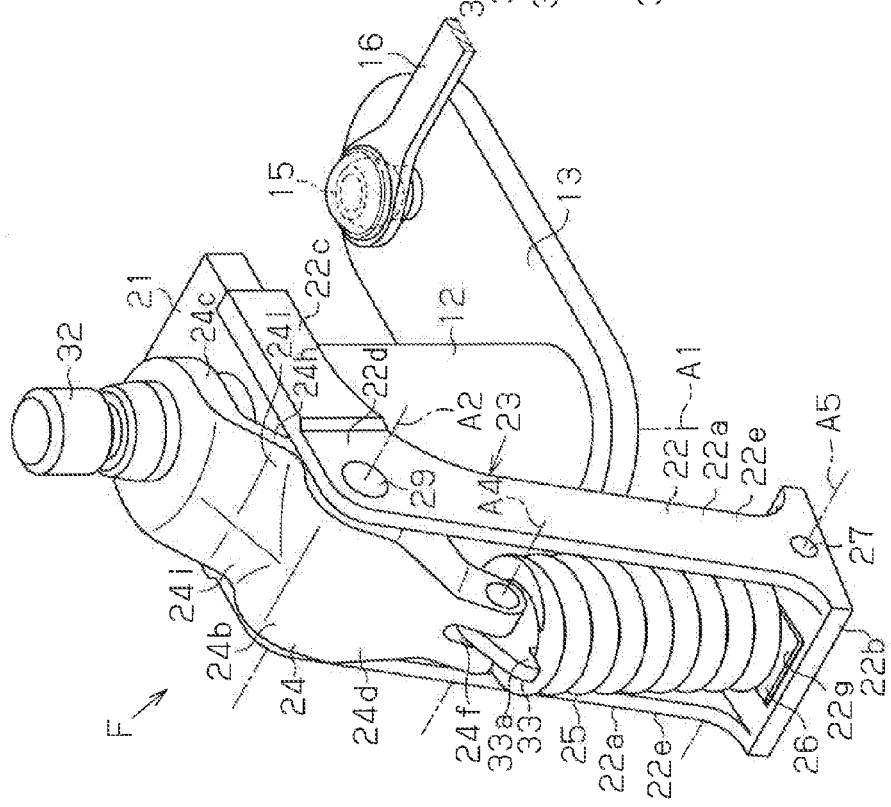

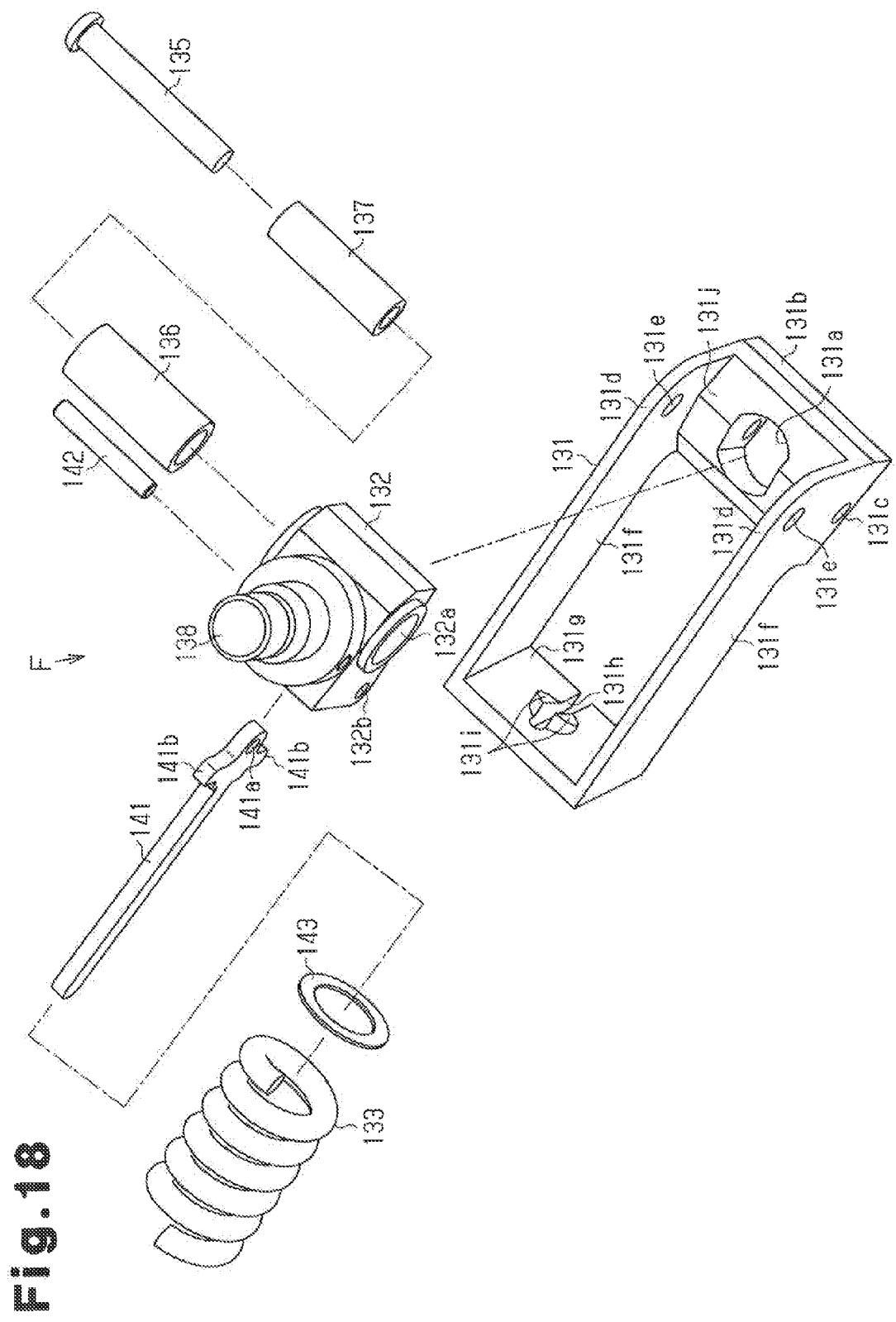

VEHICLE WIPER DEVICE

BACKGROUND OF THE INVENTION

The present invention relates to a vehicle wiper device.

In the prior art, a vehicle wiper device includes a pivot holder, which pivotally supports a pivot shaft portion and which is fixed to a vehicle body. A basal end of a swing lever is fixed to a basal end of the pivot shaft portion that projects out of a lower end of the pivot holder. A wiper arm is coupled to a distal end of the pivot shaft portion that projects out of an upper end of the pivot holder. The distal end of the swing lever is coupled to a link of a link mechanism operated by a wiper motor so that the swing lever swings at a predetermined angle. The pivot shaft portion pivots as the swing lever swings so that the wiper arm performs a wiping operation.

For such a vehicle wiper device, Japanese Laid-Open Patent Publication No. 2008-273239 discloses a device in which the basal end of the wiper arm is pivotally (tiltably) coupled to the distal end of the pivot shaft portion so that the distal end of the wiper arm may contact and move away from the wiping surface. In the vehicle wiper device, a biasing member is directly hooked to the wiper arm and the swing lever or indirectly hooked by a transmitting member to the wiper arm and the swing lever.

In such a vehicle wiper device, the biasing force of the biasing member arranged between the wiper arm and the swing lever biases the wiper arm toward the wiping surface. Thus, there is no need partially form the wiper arm with a channel-shaped cross-section and accommodate the biasing member in the channel. This increases the degree of freedom in the shape of the wiper arm.

However, in the vehicle wiper device of the publication described above, the biasing member and the transmitting member need to be arranged between the swing lever at the lower side of the pivot holder and the wiper arm at the upper side of the pivot holder. Further, the biasing member and the transmitting member are required to be hooked at the lower side and the upper side of the pivot holder. This hinders the coupling of components.

SUMMARY OF THE INVENTION

It is an object of the present invention to provide a vehicle wiper device allowing for an increase in the degree of freedom in the shape of the wiper arm and facilitating installation and coupling to a vehicle.

To achieve the above object, one aspect of the present invention is a vehicle wiper device including a drive device, a drive shaft rotated back and forth about a first axis by the drive device, a wiper arm that pivots back and forth along a wiping surface as the drive shaft rotates back and forth, and a wiper arm biasing mechanism that biases the wiper arm toward the wiping surface, wherein the wiper arm biasing mechanism includes a swing member, a tilting member, and a biasing member. The swing member is integrally pivotal with the drive shaft. The tilting member is supported by the swing member to tilt about a second axis, which intersects the first axis or is in a skew-line relationship with the first axis. The tilting member includes a wiper fixing portion to which the wiper arm is fixed. The biasing member includes a first end supported by the swing member and a second end at an opposite side of the first end. The biasing member applies a biasing force to the tilting member.

BRIEF DESCRIPTION OF THE DRAWINGS

The invention, together with objects and advantages thereof, may best be understood by reference to the following description of the presently preferred embodiments together with the accompanying drawings in which:

FIG. 3A is a side view showing the wiper arm biasing mechanism of FIG. 2 in a normal biasing state;

FIG. 3B is a side view showing the wiper arm biasing mechanism of FIG. 2 in an upright biasing state;

FIG. 9A is a side view showing a wiper arm biasing mechanism of another example in the normal biasing state;

FIG. 9B is a side view showing the wiper arm biasing mechanism of another example in the upright biasing state;

FIG. 12A is a perspective view of a wiper arm biasing mechanism including a link mechanism of another example;

FIG. 12B is a perspective view of the wiper arm biasing mechanism of FIG. 12A;

FIG. 18 is an exploded perspective view of the wiper arm biasing mechanism of FIG. 14.

DETAILED DESCRIPTION OF THE PREFERRED EMBODIMENTS

A first embodiment of the present invention will now be described with reference to FIGS. 1 to 6.

Figure 1:
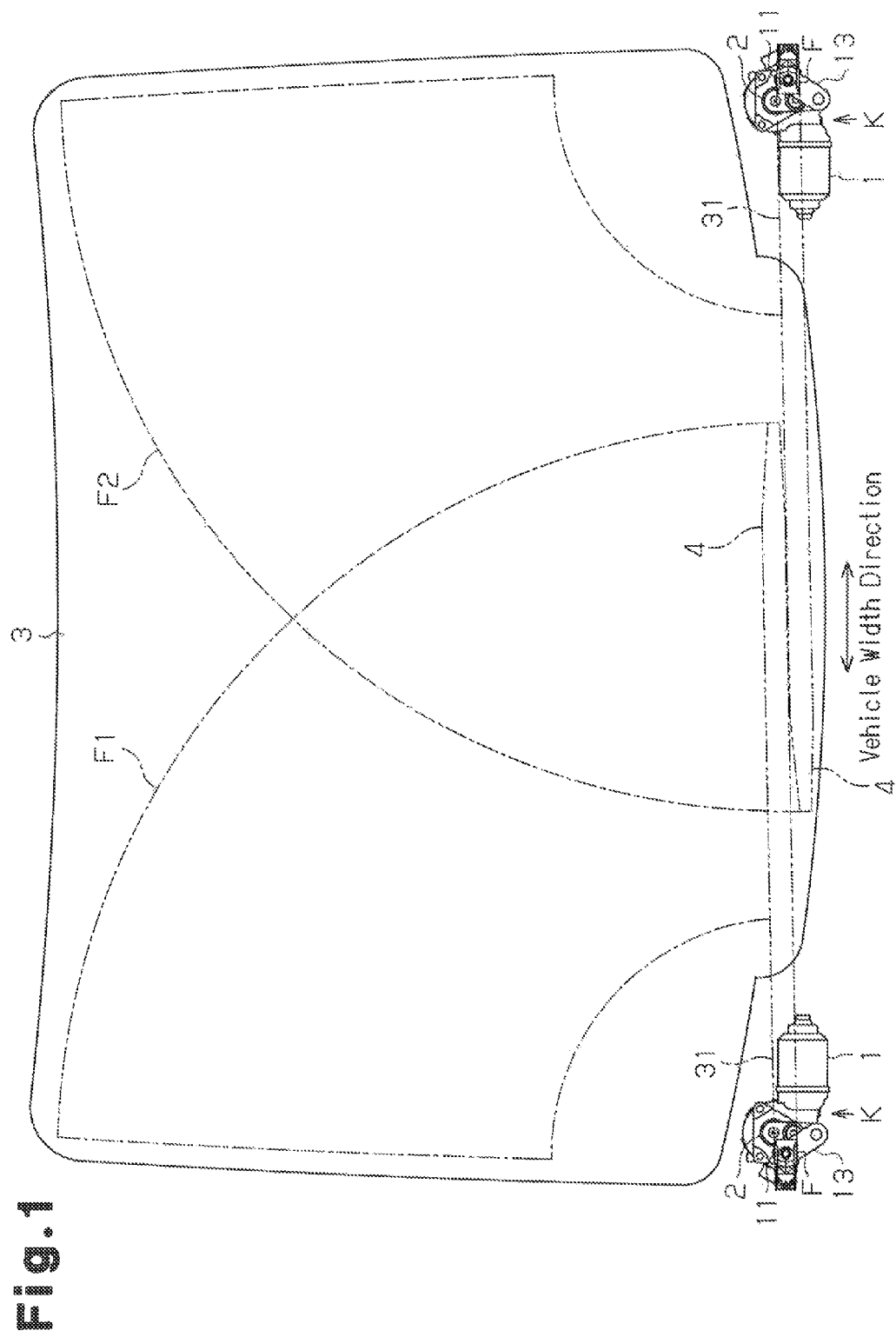
FIG. 1 is a schematic view showing the arrangement of a vehicle wiper device according to a first embodiment of the present invention.

As shown in FIG. 1, a vehicle wiper device includes two drive devices K and two wiper arm biasing mechanisms F. Each drive device K includes a motor 1 serving as a drive source and a link mechanism 2. The drive device K and the wiper arm biasing mechanism F of the present embodiment are arranged at both ends in a vehicle width direction at the lower side of a front window 3 serving as a wiping surface, that is, at portions of the vehicle located at the lower side of both ends in the vehicle width direction of the front window 3. A wiper 4 is coupled to each of the two link mechanisms 2, respectively. The wipers 4 are arranged so that at least parts of the wipers 4, that is, the distal ends of the wipers 4 overlap each other in a wiping direction, that is, a direction parallel to the wiping surface when the wipers 4 are at a lower end reverse position (lowermost end position or stop position). In other words, the wiper device of the present embodiment has the wiper 4 for the driver's seat (left side in FIG. 1) and the wiper 4 for the passenger's seat (right side in FIG. 1) arranged substantially symmetric with respect to a center in the vehicle width direction, and is configured so that a wiping range F1 of the wiper 4 on the driver's seat side (left side in FIG. 1) and a wiping range F2 of the wiper 4 on the passenger's seat side (right side in FIG. 1) overlap at a central portion of the front window 3. The wiper 4 includes a wiper arm 31 having a basal end coupled to the wiper arm biasing mechanism F, and a wiper blade coupled to the distal end of the wiper arm 31 to wipe the front window 3.

The drive device K transmits a rotation force of the motor 1 to the link mechanism 2, and pivots back and forth an output shaft of the link mechanism 2. The drive device K pivots back and forth a drive shaft 11 (see FIGS. 2 and 3) having a basal end (lower end) coupled to the output shaft of the link mechanism 2 in a range of about 90°, for example. As shown in FIG. 1, the link mechanism 2 includes a lever 13 having a first end fixed to the drive shaft 11, and a second end to which the drive force from the drive device K is input. The lever 13 extends so that the second end of the lever 13 is located at a portion of the vehicle on the opposite side of the wiper arm biasing mechanism F with respect to the drive shaft 11. The "portion of the vehicle on the opposite side" is not limited to the portion of the vehicle that is directly opposite on a straight line in which the wiper arm biasing mechanism F, the drive shaft 11, and the second end of the lever 13 are arranged, and also includes a portion of the vehicle shifted from the straight line in which the wiper arm biasing mechanism F and the drive shaft 11 are arranged such as the portion where the second end of the lever 13 is located in FIG. 1.

The drive shaft 11 of the present embodiment is pivotally supported by the drive device K by inserting an intermediate portion of the drive shaft 11 into a tubular pivot holder 12 arranged in the drive device K. The pivot holder 12 is integrally including a link case (not shown) for accommodating the link mechanism 2, and the pivot holder 12 is also fixed to the vehicle body by fixing the drive device K to the vehicle body.

Figure 2:
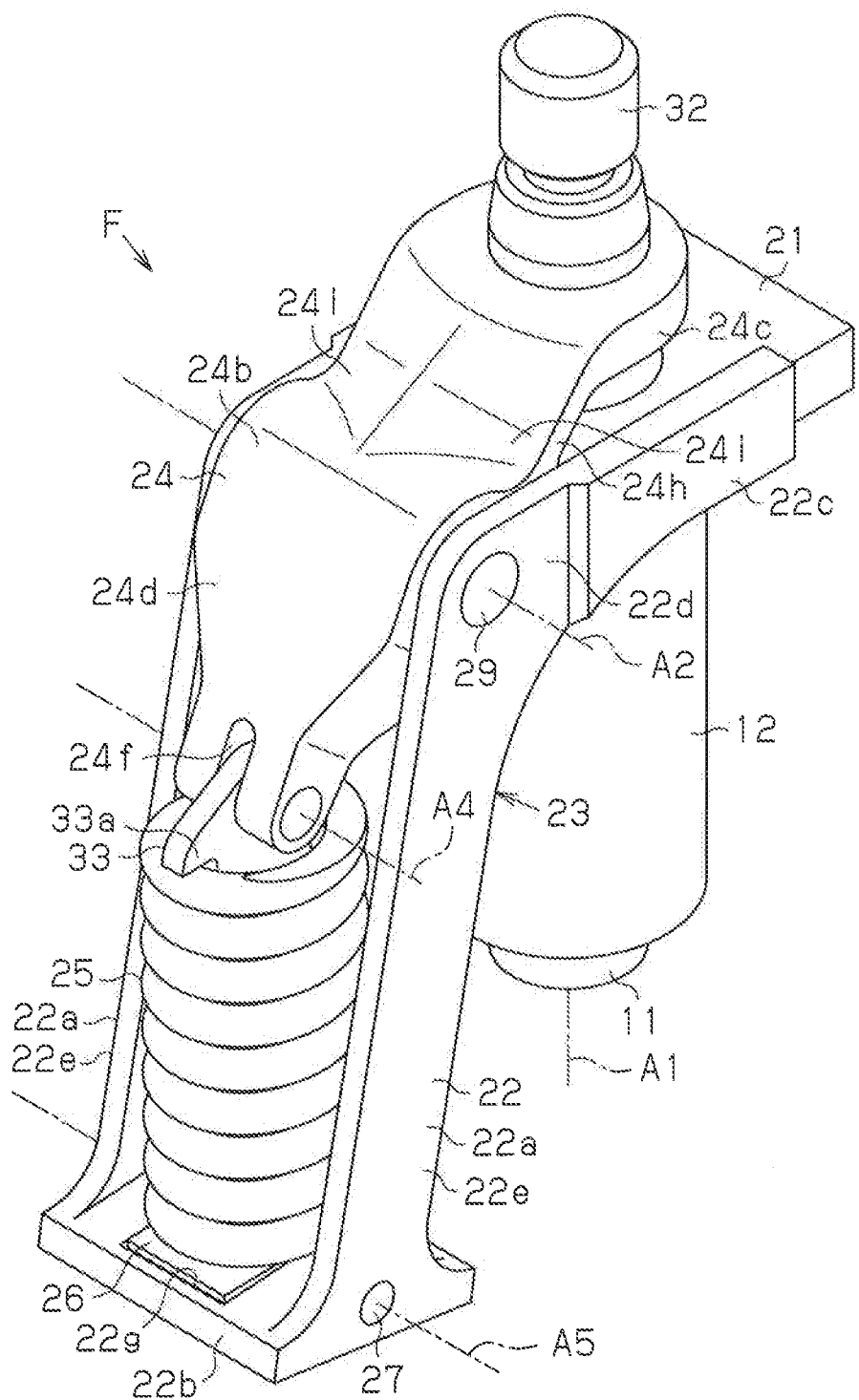
FIG. 2 is a perspective view of a wiper arm biasing mechanism of FIG. 1.

As shown in FIGS. 2 and 3, the wiper arm biasing mechanism F includes a swing member 23, a tilting member 24, and a compression coil spring 25 serving as a biasing member. The swing member 23 includes a swing base member 21 fixed to the drive shaft 11 and a swing member main body 22 fixed to the swing base member 21. The tilting member 24 is supported by the swing member main body 22 so as to be tiltable about a second axis A2 in a skew-line relationship with a first axis A1 of the drive shaft 11. The compression coil spring 25 has a first end supported by the swing member main body 22 and a second end at the opposite side of the first end, and applies a biasing force to the tilting member 24.

In detail, the swing base member 21 of the swing member 23 has a plate shape, and is formed to have a rectangular shape in which each side is slightly greater than the outer diameter of the pivot holder 12 as viewed from the shaft line direction of the drive shaft 11. The swing base member 21 is fixed to the distal end (upper end) of the drive shaft 11 projecting out of the pivot holder 12 so as to be integrally pivotal with the drive shaft 11.

As shown in FIG. 2, the swing member main body 22 of the swing member 23 includes a pair of parallel plate-like arm portions 22a, and an arm coupling portion 22b for coupling the distal ends of the arm portions 22a. A basal end side fixing part 22c of the pair of arm portions 22a sandwiches both sides of the swing base member 21 slightly projecting out of the pivot holder 12. The swing member main body 22 is fixed to be integrally pivotal with the swing base member 21.

The arm portion 22a includes an outward extending part 22d, which extends in a radial direction (orthogonal direction) of the first axis A1 of the drive shaft 11 from the basal end side fixing part 22c, and an inclined extending part 22e, which extends toward a lower side from a distal end of the outward extending part 22d and extends to move away from the first axis A1 toward the lower side. A tilting pin insertion hole 22f (see FIG. 3) is formed at the distal end of the outward extending part 22d, that is, the position corresponding to the second axis A2 in the arm portion 22a.

The arm coupling portion 22b includes both ends connected to the distal ends of the arm portions 22a (inclined extending parts 22e), and is formed to be plate-shaped. A pivot support member 26 for supporting a first end of the compression coil spring 25 is arranged to be pivotal with respect to the arm coupling portion 22b at a central part of the arm coupling portion 22b. Specifically, an accommodation hole 22g (see FIG. 2) that extends in the plate thickness direction (substantially vertical direction) is formed at the central part of the arm coupling portion 22b. A pin insertion hole 22h that extends in a direction of a fifth axis A5 (see FIG. 3) parallel to the second axis A2 is formed in the arm coupling portion 22b. The pivot support member 26 can pivot about the fifth axis A5 by inserting a pin 27, which is inserted to the pin insertion hole 22h, to its insertion hole (not shown) arranged along a straight line with the pin insertion hole 22h while being substantially accommodated in the accommodation hole 22g. The pivot support member 26 is formed to a substantially plate shape, and includes a bulging portion 26a (see FIG. 3) that bulges outward to a circular shape when seen in a direction orthogonal to a plane at a center of one of its planes (upper surface). The outer diameter of the bulging portion 26a is slightly smaller than the inner diameter of the compression coil spring 25.

The tilting member 24 includes a tilting center portion 24b, an upper extending portion 24c, and a lower extending portion 24d serving as an extending portion. The tilting center portion 24b has a tilting center hole 24a (see FIG. 3) at a position corresponding to the second axis A2. The upper extending portion 24c extends toward the upper side of the tilting center portion 24b, more specifically, along a direction the wiper arm 31 fixed to a wiper fixing shaft 32, which will be described later, extends on the upper side with respect to the tilting center portion 24b. The lower extending portion 24d extends toward the lower side of the tilting center portion 24b that is to the side opposite to the direction the wiper arm 31 extends from the wiper fixing shaft 32 on the lower side with respect to the tilting center portion 24b. A large collar 28a and a small collar 28b having a cylindrical shape are inserted through the tilting center hole 24a. A pin 29 is inserted through the tilting pin insertion hole 22f of the swing member main body 22 that is inserted to the small collar 28b. The tilting member 24 is thereby supported by the swing member main body 22 so as to be tiltable about the second axis A2 (about the pin 29).

The wiper fixing shaft 32 serving as a wiper fixing portion for fixing the wiper arm 31 of the wiper 4 is fixed to the distal end (upper end) of the upper extending portion 24c. The upper extending portion 24c and the wiper fixing shaft 32 may be integrally formed through forging and the like. The distal end (lower end) of the lower extending portion 24d includes a biased coupling hole 24e serving as a biased portion that receives the biasing force from the compression coil spring 25. The biased coupling hole 24e extends the distal end of the lower extending portion 24d along a direction in which a fourth axis A4 parallel with the second axis A2 extends.

The tilting member 24 includes a biased pivot member 33 for receiving the biasing force from the second end of the compression coil spring 25 so as to be pivotal about the fourth axis A4. Specifically, as shown in FIG. 2, the distal end (lower end) of the lower extending portion 24d is formed so that a slit 24f cut out to the upper side divides the biased coupling hole 24e. The biased pivot member 33 has a plate shape, and includes a large width basal end portion 33a, an inner fitting portion 33b, and a small width extending portion 33c. The large width basal end portion 33a has substantially the same width as the outer diameter of the compression coil spring 25 so that the second end of the compression coil spring 25 is directly brought into contact. The inner fitting portion 33b extends to the lower side with a width slightly smaller than the inner diameter of the compression coil spring 25 from the large width basal end portion 33a. The small width extending portion 33c has a width smaller than the inner fitting portion 33b and extends further to the lower side from the inner fitting portion 33b. A slit 33d extending toward the basal end side is formed at the distal end of the small width extending portion 33c. The large width basal end portion 33a is arranged in the slit 24f (see FIG. 2) of the lower extending portion 24d, and a pin 34 inserted to the biased coupling hole 24e is also inserted to a hole (not shown) of the large width basal end portion 33a. Thus, the biased pivot member 33 is supported by the tilting member 24 so as to be pivotal about the fourth axis A4 with respect to the tilting member 24. The small width extending portion 33c is coupled to the pivot support member 26 so that the distal end of the small width extending portion 33c extends through a hole (not shown) formed in the pivot support member 26 and the pin 27 is arranged in the slit 33d. The compression coil spring 25 is arranged in a compressed state between the pivot support member 26 and the large width basal end portion 33a of the biased pivot member 33. The compression coil spring 25 is externally fitted with a slight gap to the circular bulging portion 26a and the inner fitting portion 33b.

Therefore, the first end of the compression coil spring 25 is supported by the pivot support member of the swing member 23 (swing member main body 22), and the compression coil spring 25 applies the biasing force to the tilting member 24 through the large width basal end portion 33a of the biased pivot member 33 and the biased coupling hole 24e. The wiper arm biasing mechanism F is configured to switch between a normal biasing state (see FIG. 3A) serving as a first state in which the tilting member 24 is tilted by a first tilt angle with respect to the swing member 23, and an upright biasing state (see FIG. 3B) serving as a second state in which the tilting member 24 is tilted by a second tilt angle with respect to the swing member 23. The biasing direction of the compression coil spring 25 is switched in accordance with the switching of the wiper arm biasing mechanism F between the normal biasing state and the upright biasing state. Specifically, in the normal biasing state, the compression coil spring 25 biases the tilting member 24 so that the wiper arm 31 moves toward the front window 3. In the upright biasing state, the compression coil spring 25 biases the tilting member 24 so that the wiper arm 31 obtains an upright position. Specifically, in the normal biasing state (see FIG. 3A), the basal end of the wiper arm 31 is fixed to the wiper fixing shaft 32 so that the wiper arm 31 extends toward a side opposite to each member (swing member 23, tilting member 24, and compression coil spring 25) configuring the wiper arm biasing mechanism F with respect to the wiper fixing shaft 32. As shown in FIG. 3A, when a biasing force Fa from the fifth axis A5 located in the vicinity of the supporting end of the compression coil spring 25 toward the fourth axis A4 is on the outer side of a line L extending through the fifth axis A5 and the second axis A2, that is, directed toward the side opposite to the distal end of the wiper 4, the compression coil spring 25 biases the tilting member 24 in a direction the wiper arm 31 moves toward the wiping surface (clockwise direction in FIG. 3A). As shown in FIG. 3B, when a biasing force Fb from the fifth axis A5 toward the fourth axis A4 is on the inner side of the line L extending through the fifth axis A5 and the second axis A2, that is, directed toward the distal end of the wiper 4, the compression coil spring 25 biases the tilting member 24 so that the wiper arm 31 obtains the upright position, that is, in a direction the wiper arm 31 moves away from the front window 3 (counterclockwise direction in FIG. 3B).

Figure 4:
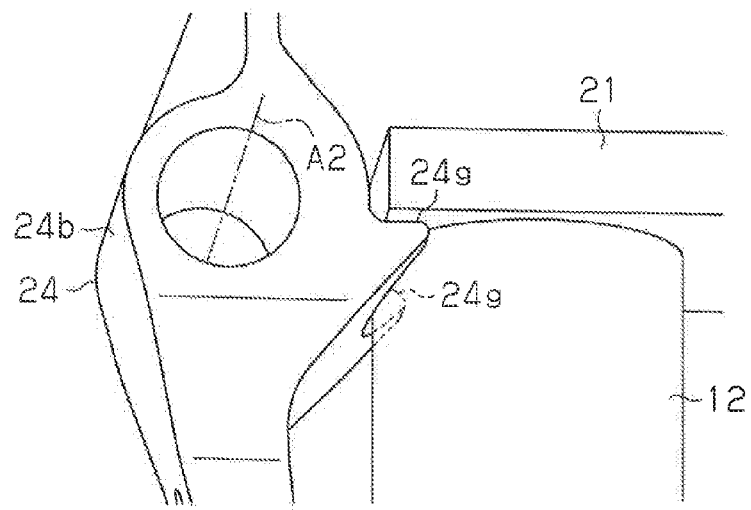
FIG. 4 is a partially enlarged perspective view for showing a restriction piece of the wiper arm biasing mechanism of FIG. 2.

As shown in FIG. 3B, the tilting member 24 includes a restriction piece 24g serving as a pair of restriction portions. The restriction piece 24g restricts the tilting member 24 from tilting greater than a preset tilt angle when the wiper arm biasing mechanism F is in the upright biasing state that biases the wiper arm 31 to the upright position. As shown in FIG. 4, the restriction piece 24g of the present embodiment projects out of the tilting center portion 24b to contact the lower surface of a corner portion slightly projecting out of the pivot holder 12 at the swing base member 21. The restriction piece 24g thereby restricts the tilting of the tilting member 24. The pair of restriction pieces 24g is arranged along a direction in which the second axis A2 extends so as to respectively correspond to the corner portions at two areas of the swing base member 21. The pair of restriction pieces 24g is formed to have an arcuate shape along the pivot holder 12, that is, to avoid the pivot holder 12. Thus, the restriction piece 24g can contact the lower surface of the swing base member 21 in an area as wide as possible. As shown in FIG. 3B, the restriction piece 24g of the present embodiment restricts the tilting of the tilting member 24 at an angle at which the wiper fixing shaft 32 is tilted about 45° with respect to the first axis A1 of the drive shaft 11.

The vehicle wiper device of the present embodiment is configured so that the line (line along the biasing forces Fa, Fb) extending through the center of the first end and the center of the second end of the compression coil spring 25 has an angle of 45° or less with the first axis A1 of the drive shaft 11 in the normal biasing state (see FIG. 3A) and in the upright biasing state (see FIG. 3B) as viewed from the direction in which the second axis A2 extends.

In the tilting member 24, an intermediate portion 24h located between the tilting center portion 24b and the wiper fixing shaft 32 (distal end of the upper extending portion 24c) includes a clearance portion 24i for making the pivot path range of the intermediate portion 24h smaller as viewed from the direction in which the first axis A1 extends. The clearance portion 24i prevents interference of the intermediate portion 24h and a louver 41 when the swing member 23 is pivoted about the drive shaft 11.

Figure 5:
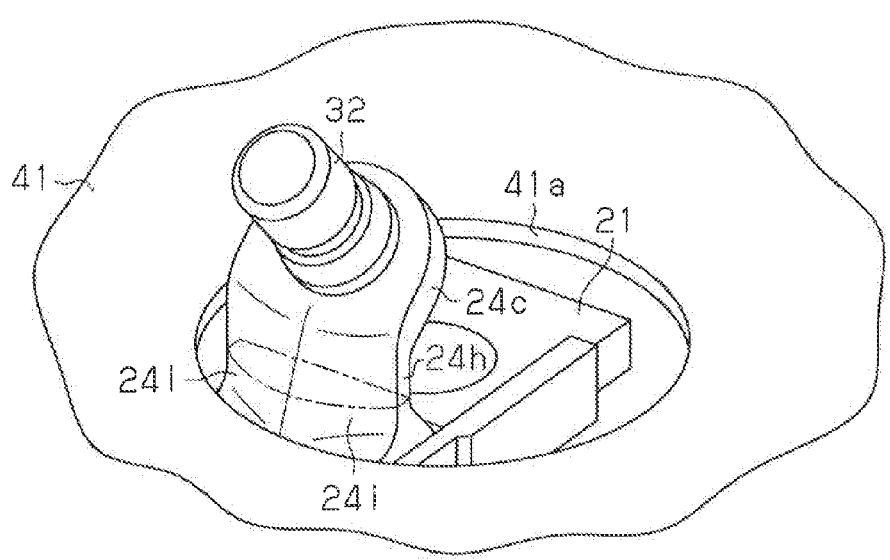
FIG. 5 is a partially enlarged perspective view showing the wiper arm biasing mechanism of FIG. 2 in the upright biasing state.

Specifically, the intermediate portion 24h of the present embodiment is formed to a substantially tetragonal cross-section as viewed from the direction in which the first axis A1 extends. The clearance portion 24i is formed at an end in a circumferential direction on a radially outer side surface of the intermediate portion 24h by thinning the end in the circumferential direction of the intermediate portion 24h in a radial direction about the first axis A1. The clearance portion 24i of the present embodiment is formed by having the radially outer side surface of the intermediate portion 24h seen from the direction in which the first axis A1 extends to an arcuate surface having the center near the drive shaft 11. In FIG. 5, the cross-section of the intermediate portion 24h at a position corresponding to the clearance portion 24i when the wiper arm biasing mechanism F is in the upright biasing state (see FIG. 3B) is shown with a double-dashed line.

Figure 6:
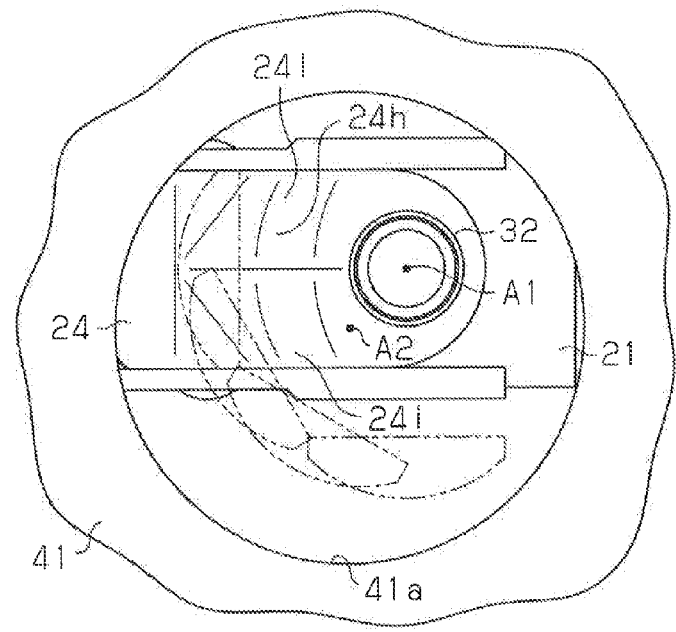
FIG. 6 is a plan view showing the arrangement of the vehicle wiper device of FIG. 1.

As shown in FIGS. 3A, 3B, and FIG. 5, most of the mechanism of the vehicle wiper device is arranged on the vehicle interior side than the louver 41 of the vehicle. Specifically, the vehicle wiper device is arranged so that the intermediate portion 24h extends through a substantially circular outlet hole 41a formed in the louver 41, and a portion (wiper fixing shaft 32, etc.) of the vehicle wiper device closer to the distal end than the intermediate portion 24h is exposed to the outside. As shown in FIG. 6, in the present embodiment, the first axis A1 of the drive shaft 11 is shifted in a direction the pivot path of the intermediate portion 24h moves away from an edge of the outlet hole 41a in the pivot range thereof with respect to a sixth axis A6 of the outlet hole 41a. FIG. 6 shows the cross-section of the intermediate portion 24h at the position corresponding to the clearance portion 24i in the upright biasing state (see FIG. 3B) and the cross-section of the intermediate portion 24h at three positions within the pivot path range of the intermediate portion 24h with a double-dashed line. The three positions include the position of the intermediate portion 24h when the wiper 4 is at the upper end reverse position. Specifically, the first axis A1 is arranged shifted with respect to the sixth axis A6 so that the intermediate portion 24h approaches the sixth axis A6 of the outlet hole 41a when the intermediate portion 24h is at an intermediate point on the pivot path range.

The operation of the vehicle wiper device of the first embodiment will now be described.

For example, when the motor 1 is driven, the drive force of the motor 1 is input to the second end of the lever of the link mechanism 2 thus pivoting the lever. This integrally pivots, back and forth, the wiper arm biasing mechanism F and the wiper 4 (wiper arm 31) in a pivoting angular range of about 90° with the drive shaft 11, which is fixed to the first end of the lever, to perform the wiping operation.

In this case, as shown in FIG. 3A, when the biasing force Fa from the fifth axis A5 located in the vicinity of the supporting end of the compression coil spring 25 toward the fourth axis A4 is directed toward the outer side than the line L extending through the fifth axis A5 and the second axis A2, the compression coil spring 25 biases the tilting member 24 in the direction (clockwise direction in FIG. 3A) of moving the wiper arm 31 toward the wiping surface. Thus, even if the wiper 4 moves slightly upward and downward along the shape of the wiping surface, that is, in the direction orthogonal to the front window 3 when the wiper 4 (wiper arm 31) is pivoted back and forth in the pivoting angular range of about 90°, the wiper 4 is appropriately pressed against the wiping surface and the satisfactory wiping operation is carried out.

For example, when the operator, or the like lifts the wiper 4 (wiper arm 31) in the stopped state of the motor 1, the biasing force Fb of the compression coil spring 25 switches to a state directed toward the inner side of the line L as shown in FIG. 3B, and the compression coil spring 25 biases the tilting member 24 so that the wiper arm 31 moves to the upright position (counterclockwise direction in FIG. 3B). As shown in FIGS. 3B and 4, the restriction piece 24g restricts further tilting of the tilting member 24 by contacting the swing base member 21 of the swing member 23, thus maintaining the upright state of the wiper 4 (wiper arm 31) at that tilt angle.

The embodiment described above has the following advantages.

(1) The tilting member 24 is supported by the swing member 23, and the compression coil spring 25 is supported by the swing member 23 and applies the biasing force to the tilting member 24. This concentrates the members for biasing the wiper arm 31 (wiper 4) in the wiper arm biasing mechanism F. Thus, there is no need to partially form the wiper arm 31 with a channel-shaped cross-section to accommodate the biasing member (compression coil spring) in the channel-shaped portion. The degree of freedom in the shape of the wiper arm 31 thus increases. The wiper arm 31 is biased by simply arranging the wiper arm biasing mechanism F between the drive shaft 11 and the wiper arm 31. Thus, for example, the assembling is completed by fixing the wiper arm biasing mechanism F, in which the compression coil spring 25 and the like are assembled in advance, to the drive shaft 11, and fixing the wiper arm 31 to the wiper fixing shaft 32 of the wiper arm biasing mechanism F. Thus, the coupling properties are more satisfactory compared to the conventional configuration that needs to hook the biasing member and the like at the lower side and the upper side of the pivot holder.

(2) Each member (swing member 23, tilting member 24, and compression coil spring 25) configuring the wiper arm biasing mechanism F is arranged at a portion of the vehicle on the opposite side of the distal end of the wiper arm 31 with respect to the wiper fixing shaft 32. Thus, the swing member 23, the tilting member 24, and the compression coil spring 25 pivot at the portion of the vehicle on the opposite side of the distal end of the wiper arm 31, that is, the position in the vicinity of the hood on the opposite side of the front window 3, with respect to the wiper fixing shaft 32 (first axis A1 of the drive shaft 11). Therefore, the arrangement space of each member (swing member 23, tilting member 24, and compression coil spring 25) is easily ensured, and each member (swing member 23, tilting member 24, and compression coil spring 25) is easily arranged.

(3) When seen in a direction in which the second axis A2 extends, the line (line along the biasing forces Fa, Fb) extending through the center of each end of the compression coil spring 25 forms an angle of 45° or less with the first axis A1. Thus, the arrangement space in the radial direction (direction orthogonal to the first axis A1) of the first axis A1 becomes smaller. In other words, an occupying space used by the wiper arm biasing mechanism F to pivot is required around the first axis A1 since the wiper arm biasing mechanism F pivots with the drive shaft 11. However, the occupying space is decreased since the arrangement space in the radial direction is decreased.

(4) The tilting member 24 is supported by the swing member 23. Thus, the member (wiper arm biasing mechanism F) for biasing the wiper arm 31 is concentrated at one end without being separated to the two ends of the drive shaft 11. Thus, the wiper arm 31 is biased by simply arranging the wiper arm biasing mechanism F between the drive shaft 11 and the wiper arm 31, and installation to the vehicle becomes satisfactory, for example.

(5) Each member excluding the wiper fixing shaft 32 configuring the wiper arm biasing mechanism F is arranged on the lower side than the wiper fixing shaft 32. Thus, each member is easily arranged inside the outlet hole 41a formed in the louver 41 thus improving the outer appearance.

(6) The swing member 23 pivotally includes the pivot support member 26 for supporting the first end of the compression coil spring 25. Thus, when the tilt angle of the wiper arm 31 and the tilting member 24 is changed, the position shift of the surface of the pivot support member, which supports the first end of the compression coil spring 25, from the compression coil spring 25 in a direction orthogonal to the biasing direction (biasing force Fa, Fb) of the compression coil spring 25 is reduced. Therefore, the loss of the biasing force Fa, Fb by the compression coil spring 25 is reduced. As a result, for example, the necessary biasing force is easily ensured even if the wire rod of the compression coil spring 25 is thinned or the diameter of the compression coil spring 25 is reduced.

(7) The tilting member 24 pivotally includes the biased pivot member 33 for receiving the biasing force Fa, Fb from the second end of the compression coil spring 25. Thus, when the tilt angle of the wiper arm 31 and the tilting member 24 is changed, the position shift, of the surface of the biased pivot member 33, which receives the biasing force Fa, Fb from the second end of the compression coil spring 25, from the compression coil spring 25 in a direction orthogonal to the biasing direction of the compression coil spring 25 is reduced. Thus, the loss of the biasing force by the compression coil spring 25 is further reduced.

(8) The wiper arm biasing mechanism F is configured to switch between the normal biasing state in which the tilting member 24 is tilted by the first tilt angle with respect to the swing member 23, and the upright biasing state in which the tilting member 24 is tilted by the second tilt angle with respect to the swing member 23. In the normal biasing state, the compression coil spring 25 biases the tilting member 24 so that the wiper arm 31 moves toward the front. window 3. In the upright biasing state, the compression coil spring 25 biases the tilting member 24 so that the wiper arm 31 obtains the upright position. Thus, the wiper arm biasing mechanism F has a so-called lock-back function. In such configuration, the tilt angle of the wiper arm 31 and the tilting member 24 greatly changes, and thus the loss may occur in the biasing force Fa, Fb by the compression coil spring 25. However, with the arrangement of the pivot support member 26, the relative position in the direction orthogonal to the biasing direction of the compression coil spring 25 of the surface of the pivot support member 26 for supporting the first end of the compression coil spring 25 and the compression coil spring 25 is maintained in both the normal biasing state and the upright biasing state. Thus, the effect of reducing the loss of the biasing force Fa, Fb by the compression coil spring 25 becomes greater.

(9) The clearance portion 24i is formed in the intermediate portion 24h between the tilting center portion 24b of the tilting member 24 and the wiper fixing shaft 32. The clearance portion 24i allows the pivot path range of the intermediate portion 24h when the tilting member 24 is pivoted about the first axis A1 to be smaller when viewed from the direction in which the first axis A1 extends. Thus, the interference of the tilting member 24 and the louver 41 is prevented. The outlet hole 41a formed in the louver 41 thus becomes smaller.

(10) The intermediate portion 24h of the tilting member 24 is formed to a substantially tetragonal cross-section when viewed from the direction in which the first axis A1 extends. The clearance portion 24i is formed at the end in the circumferential direction on the radially outer side surface of the intermediate portion 24h by thinning the ends in the circumferential direction of the intermediate portion 24h in the radial direction. Thus, the rigidity of the intermediate portion 24h is kept high, and the interference of the intermediate portion 24h and the edge of the outlet hole 41a formed in the louver 41 is prevented by decreasing the pivot path range of the intermediate portion 24h.

(11) The clearance portion 24i is formed so that the radially outer side surface of the intermediate portion 24h is an arcuate surface having a center in the vicinity of the drive shaft 11 when viewed from the direction in which the first axis A1 extends. Thus, the interference of the intermediate portion 24h and the edge of the outlet hole 41a is prevented by decreasing the pivot path range of the intermediate portion 24h while keeping the rigidity of the intermediate portion 24h high.

(12) The drive shaft 11 is arranged so that the pivot path of the intermediate portion 24h shifts away from the edge of the outlet hole 41a in the pivot range. The first axis A1 of the drive shaft 11 shifts from the sixth axis A6 of the outlet hole 41a of the louver 41 so that the intermediate portion 24h moves away from the edge of the outlet hole 41a with the pivoting of the wiper 4. Thus, the outlet hole 41a becomes smaller, and the intermediate portion 24h is suppressed from striking the edge of the outlet hole 41a.

(13) The tilting member 24 includes the restriction piece 24g for restricting tilting of the tilting member 24 to greater than or equal to the preset tilt angle when the compression coil spring 25 is in the upright biasing state. Thus, the maximum tilt angle of the tilting member 24, and furthermore, the upright angle of the wiper arm 31 is determined by the restriction piece 24g. Thus, the mechanism and shape for determining the upright angle does not need to be arranged as a separate member in the wiper arm 31. This increases the degree of freedom in the shape of the wiper arm 31, and allows for simplification.

(14) The pair of restriction pieces 24g is arranged along the direction in which the second axis A2 extends. Thus, for example, the tilting of the tilting member 24 strongly restricted in a balanced manner.

(15) The link mechanism 2 includes the lever 13 having the first end fixed to the drive shaft 11 and the second end to which the drive force from the drive device K is input. The lever 13 extends so that the second end of the lever 13 is located at the portion of the vehicle on the opposite side of the wiper arm biasing mechanism F with respect to the drive shaft 11. In other words, other members of the link mechanism 2 connected to the second end of the lever 13 are located at the portion of the vehicle on the opposite side of the wiper arm biasing mechanism F with respect to the drive shaft 11. Thus, when the lever 13 is pivoted to pivot the wiper arm 31, the interference of the member other than the lever 13 of the link mechanism 2 and the wiper arm biasing mechanism F is prevented. Furthermore, in order to prevent the interference in the configuration in which the second end of the lever 13 is located at the portion of the vehicle on the same side as the wiper arm biasing mechanism F with respect to the drive shaft 11, the size of the wiper device in at least one of the direction the first axis A1 extends or the direction orthogonal to the first axis A1 needs to be enlarged. According to the embodiment described above, the occupying space of the wiper device is easily ensured since the size of the wiper device is reduced.

A second embodiment of the present invention will now be described with reference to FIGS. 14 to 18. A vehicle wiper device of the second embodiment differs from the vehicle wiper device of the first embodiment in the configuration of the wiper arm biasing mechanism F. Parts that are the same as the first embodiment will now be described.

Figure 14:
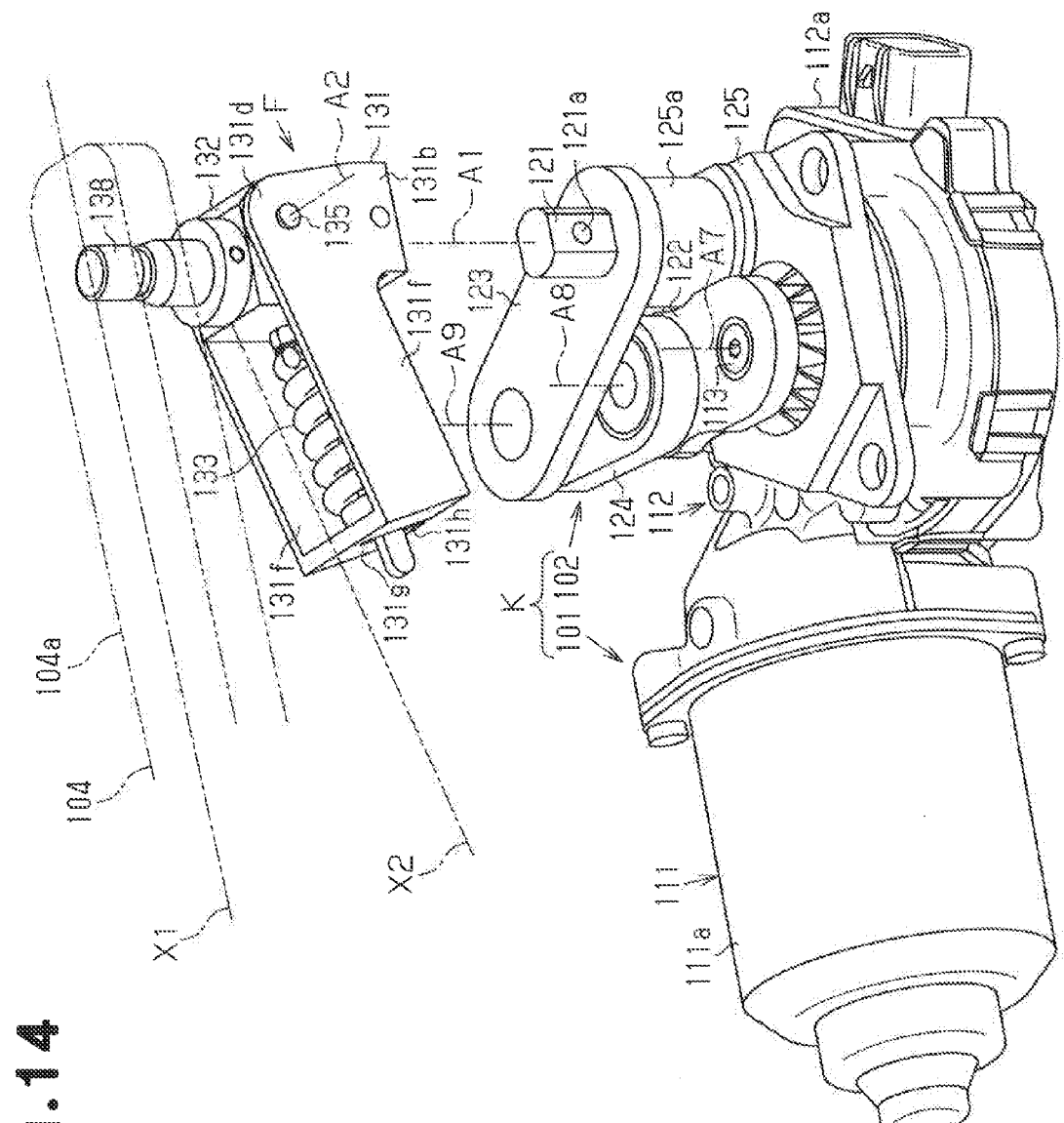
FIG. 14 is a perspective view showing a drive device and a wiper arm biasing mechanism of a vehicle wiper device according to a second embodiment.
Figure 15:
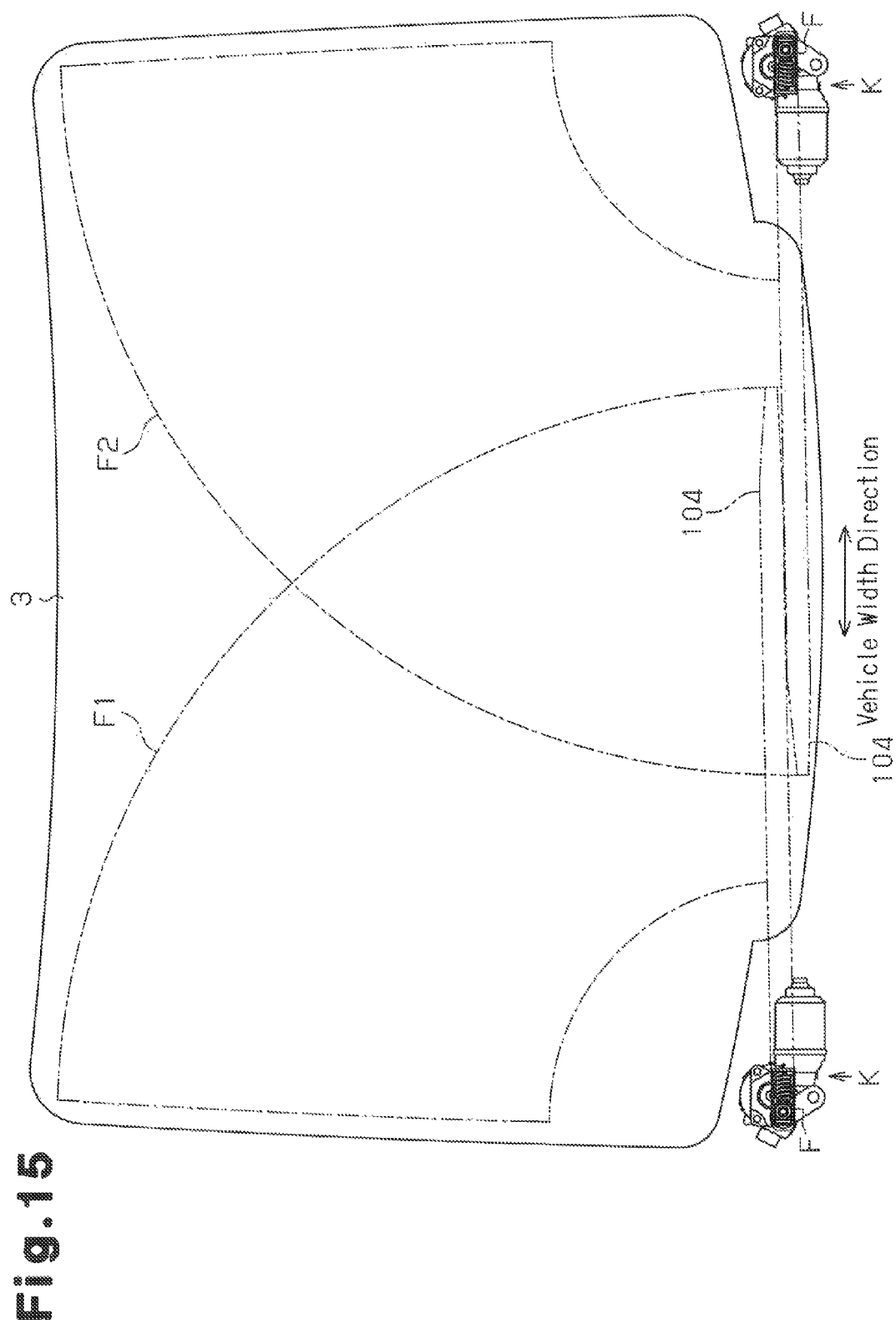
FIG. 15 is a schematic view showing an arrangement state of the vehicle wiper device of FIG. 14.
Figure 16:
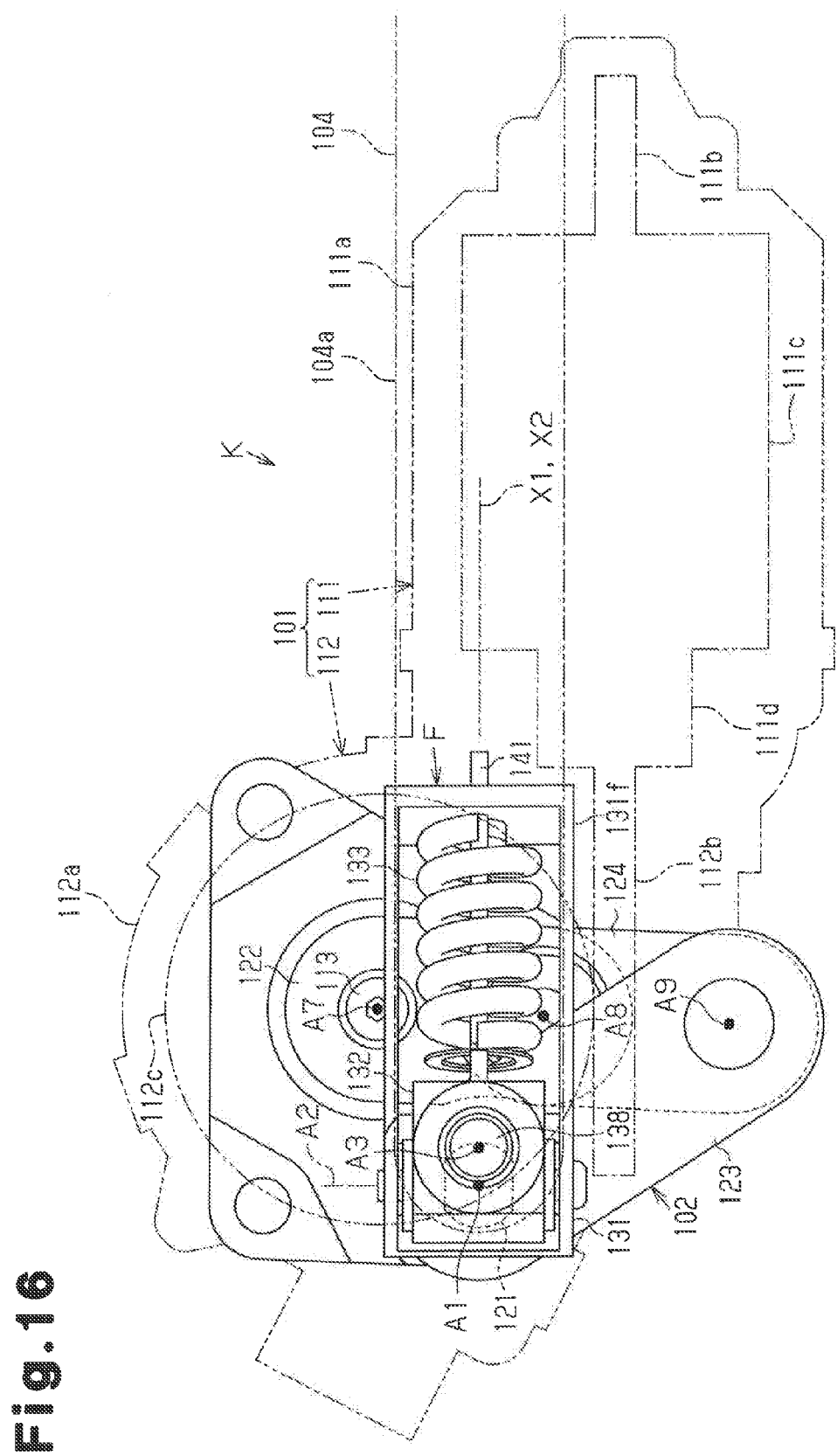
FIG. 16 is a plan view of a link mechanism and the wiper arm biasing mechanism of FIG. 14.

As shown in FIGS. 14 and 16, a motor 101 includes a motor main body 111 and a reduction drive 112. As shown in FIG. 16, the motor main body 111 includes a substantially tubular yoke 111a with a closed end, a permanent magnet (not shown) fixed to an inner surface of the yoke 111a, a rotation shaft 111b arranged in the yoke 111a and rotatably supported by the yoke 111a, an armature core 111c fixed to the rotation shaft 111b, a winding (not shown) wound around the armature core 111c, a commutator 111d, and the like. The motor main body 111 rotates and drives the rotation shaft 111b. The reduction drive 112 includes a gear housing 112a fixed to the open end of the yoke 111a, a worm 112b that integrally rotates with the rotation shaft 111b in the gear housing 112a, a worm wheel 112c mated with the worm 112b, and an output shaft 113 that projects out of the gear housing 112a and that integrally rotates with the worm wheel 112c. The worm 112b and the worm wheel 112c configure a worm gear. The worm gear decelerates the rotation of the rotation shaft 111b and rotates the output shaft 113. The motor 101 of this example includes a sensor (e.g., magnetic resistance element such as MR sensor, etc.), which is not shown, capable of detecting the rotation angle of the worm wheel 112c. The motor 101 is controlled based on the detection signal from the sensor to pivot, back and forth, the worm wheel 112c and the output shaft 113 in the pivoting angular range (220° in this example) set in advance of greater than 180° and smaller than 360°.

The link mechanism 102 is coupled to the output shaft 113, and is configured to rotate, back and forth, the drive shaft 121, which is coupled so that the wiper arm biasing mechanism F is integrally pivotal, in the pivoting angular range (90° in the present embodiment) that is smaller than the pivoting angular range (220° in the example) of the output shaft 113.

Specifically, as shown in FIG. 14, the link mechanism 102 includes a crank 122, a lever 123, and a rod 124. The crank 122 has a basal end fixed to the output shaft 113, and a distal end at the opposite side of the basal end. The rod 124 includes a basal end coupled to the distal end of the crank 122 so as to be rotatable about an eighth axis A8 and a distal end at the opposite side of the basal end. The lever 123 includes a basal end coupled to the distal end of the rod 124 so as to be rotatable about a ninth axis A9, and a distal end that is located at the opposite side of the basal end and that supports a wiper coupling portion 138. The first axis A1 of the drive shaft 121 is separated from a seventh axis A7 of the output shaft 113. The lever 123 (drive shaft 121) is fixed to the gear housing 112a and supported by the pivot holder 125a (see FIG. 14), which is arranged in an attachment bracket 125 and fixed to the vehicle so as to be pivotal about the first axis A1. The drive shaft 121 projecting upward (upper side of the flat upper surface of the lever 123) from the upper end of the pivot holder 125a in the present embodiment has a shape of width across flat surfaces having two flat parallel surfaces. A through-hole 121a is formed at the middle of the flat surface.

As shown in FIGS. 14 and 16 to 18, the wiper arm biasing mechanism F includes a swing member 131 fixed to the drive shaft 121, a tilting member 132 supported by the swing member 131 so as to tilt about the second axis A2 extending in the direction orthogonal to the first axis A1 of the drive shaft 121, and a compression coil spring 133 serving as a biasing member, supported by the swing member 131, for applying the biasing force on the tilting member 132.

Figure 17A:
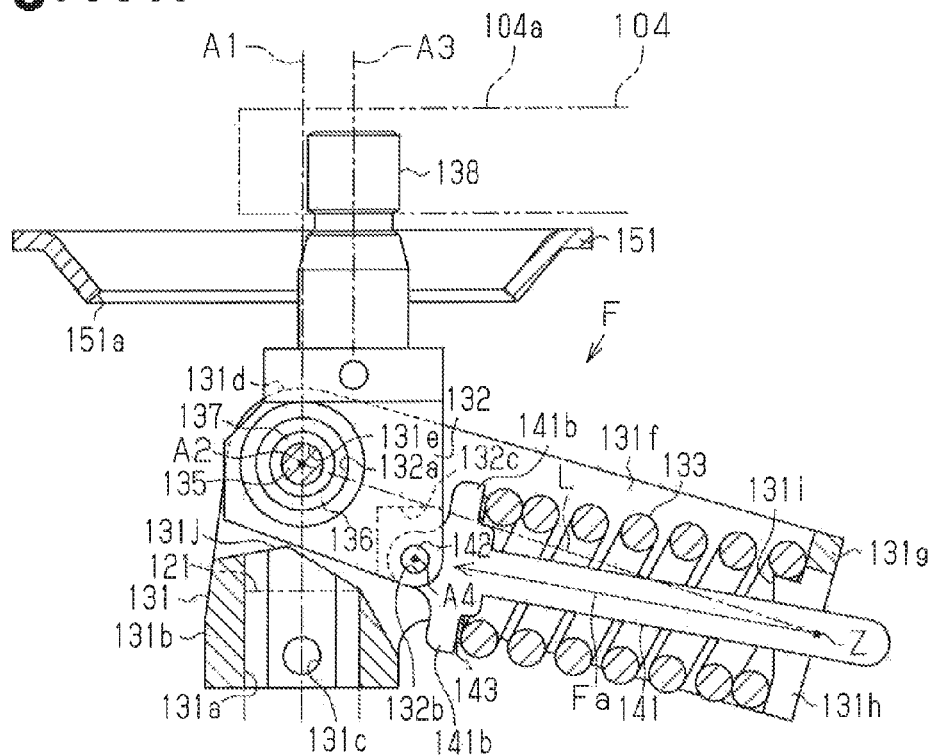
FIGS. 17A and 17B are partial cross-sectional views of the wiper arm biasing mechanism of FIG. 14.
Figure 17B:
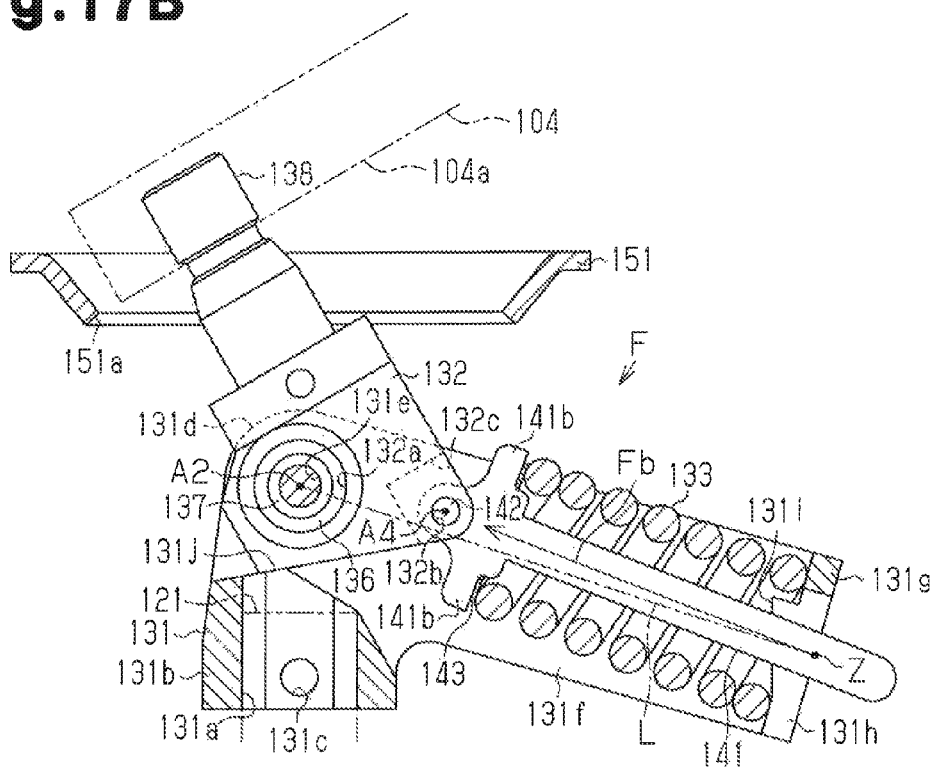

Specifically, as shown in FIGS. 17A and 17B, the swing member 131 has a base 131b including a vertical through-hole 131a to which the drive shaft 121 is internally fitted. The vertical through-hole 131a is shaped so that the drive shaft 121 can be internally fitted, that is, so that a space seen from the vertical direction has a shape of width across flat surfaces. The base 131b has a periphery with a substantially tetragonal shape as viewed from the vertical direction. At the base 131b, a first through-hole 131c is formed at a position (middle of the pair of side walls) corresponding to the through-hole 121a (see FIG. 14) of the drive shaft 121. The swing member 131 is fixed to the drive shaft 121 by internally fitting the drive shaft 121 to the vertical through hole 131a and fitting and inserting a fixing pin (not shown) to the first through-hole 131c and the through-hole 121a. The swing member 131 includes a pair of plate-like upper extending portions 131d (see FIG. 18) extending so that the outer side surface formed with the first through-hole 131c extends to the upper side at the substantially tetragonal periphery of the base 131b. in the plate-like upper extending portion 131d, a second through-hole 131e is formed at the upper side of the first through-hole 131c.

The swing member 131 also includes plate-like side extending portions 131f extending from the plate-like upper extending portion 131d toward the side (radially outer side with the vertical through-hole 131a as the center), specifically, diagonally downward from the side. The two plate-like side extending portions 131f are parallel and extend from each plate-like upper extending portion 131d. The swing member 131 also includes a plate-like supporting wall 131g that connects the distal ends of the plate-like side extending portions 131f. A slit 131h that extends in the plate thickness direction and opens to the lower side is formed at the lower side of the middle in the width direction (direction orthogonal to the plane of drawing in FIGS. 17A and 17B) of the plate-like supporting wall 131g. Two inclined projections 131i that project more toward the upper side are formed on both sides of the slit 131h at the inner side surface of the plate-like supporting wall 131g (surface on the side surrounded with the plate-like side extending portion 131f). The pair of inclined projections 131i are formed to a shape (see FIG. 18) in which one circle is divided by the slit 131h as viewed from the inner side (projecting direction).

The tilting member 132 has a substantially cubic shape and is arranged between the two plate-like upper extending portions 131d (one part is arranged between the pair of plate-like side extending portions 131f), and includes a shaft insertion hole 132a at a position corresponding with the second through-hole 131e. The tilting member 132 is supported by the swing member 131 so as to be tiltable about the second axis A2 orthogonal to the first axis A1 of the drive shaft 121 by inserting the shaft pin 135 to the second through-hole 131e and inserting the shaft pin 135 to the shaft insertion hole 132a through first and second bushing 136, 137.

A wiper fixing shaft 138 serving as a wiper fixing portion for fixing the wiper are 104a of the wiper 104 is fixed to the upper surface of the tilting member 132. As shown in FIG. 17A, the wiper fixing shaft 138 is arranged at a portion (right side in FIG. 17A) closer to the distal end than the basal end of the wiper arm 104a when seen in a state a third axis A3 is parallel to the first axis A1 of the drive shaft 121. The wiper arm 104a is fixed to the wiper fixing shaft 38 so that a longitudinal direction X1 (see FIG. 14) extends in the same direction as a longitudinal direction (direction in which the plate-like side extending portion 131f extends) X2 (see FIG. 14) of the wiper arm biasing mechanism F when viewed from the direction of the first axis A1 (see FIG. 16) of the drive shaft 121.

An auxiliary support member coupling hole 132b parallel to the shaft insertion hole 132a is formed at the lower end of the portion near the plate-like supporting wall 131g of the tilting member 132. A slit 132c open to the side and the lower side is formed at the middle in the width direction (direction orthogonal to the plane of drawing in FIGS. 17A and 17B) at the lower end (i.e., position corresponding with the auxiliary support member coupling hole 132b) of the portion closer to the plate-like supporting wall 131g of the tilting member 132. A basal end of a substantially rod-shaped auxiliary support member 141 is accommodated in the slit 132c of the tilting member 132, and the tilting member 132 is pivotally supported relative to the basal end of the auxiliary support member 141. In other words, the basal end of the auxiliary support member 141 is arranged in the slit 132c, a shaft pin 142 is fitted and inserted to the auxiliary support member coupling hole 132b, and the shaft pin 142 is inserted into a through-hole 141a (see FIG. 18) formed at the basal end of the auxiliary support member 141, so that the auxiliary support member 141 is supported by the tilting member 132 so as to be pivotal about a fourth axis A4 parallel to the second axis A2.

The auxiliary support member 141 has a length set so that the distal end extends through the slit 131h of the plate-like supporting wall 131g. A pair of receiving portions 141b projecting in the direction orthogonal to the longitudinal direction is formed at the basal end of the auxiliary support member 141. The compression coil spring 133 is arranged between the plate-like supporting wall 131g and the receiving portion 141b of the auxiliary support member 141 in a state externally fitted (loosely fitted) to the auxiliary support member 141 while being compressed. In the present embodiment, an annular washer 143 is arranged between the receiving portion 141b and the compression coil spring 133 so that a local force (reaction force of biasing force) is not applied from the receiving portion 141b to the compression coil spring 133. In the present embodiment, the compression coil spring 133 is first externally fitted to the auxiliary support member 141 without the distal end of the auxiliary support member 141 arranged in the slit 131h. The auxiliary support member 141 is then pivoted while compressing the compression coil spring 133 to insert the distal end into the slit 131h. The compression coil spring 133 then moves over the inclined projection 131i so that the compression coil spring 133 is fitted to the inclined projection 131i. The compression coil spring 133 is arranged between the pair of plate-like side extending portions 131f in the coupled state described above, and is substantially covered by the plate-like side extending portion 131f as viewed from the side.

Thus, the compression coil spring 133 is supported by the plate-like supporting wall 131g of the swing member 131, and applies the biasing force to the tilting member 132 through the auxiliary support member 141. The wiper arm biasing mechanism F is configured to switch between a normal biasing state (see FIG. 17A) serving as a first state in which the tilting member 132 is tilted by a first tilt angle with respect to the swing member 131, and an upright biasing state (see FIG. 17B) serving as a second state in which. the tilting member 132 is tilted by a second tilt angle with respect to the swing member 131. The biasing direction of the compression coil spring 133 is switched in accordance with the switching of the wiper arm biasing mechanism F between the normal biasing state and the upright biasing state. Specifically, in the normal biasing state, the compression coil spring 133 biases the tilting member 132 so that the wiper arm 104a moves toward the front window 3. In the upright biasing state, the compression coil spring biases the tilting member 132 so that the wiper arm 104a obtains an upright position. Specifically, as shown in FIG. 17A, when the biasing force Fa from the supporting center Z of the compression coil spring 133 toward the fourth axis A4 of the auxiliary support member 141 is at the lower side of the line L extending through the supporting center Z of the compression coil spring 133 and the second axis A2 of the tilting member 132, that is, directed toward the lower side in the direction in which the first axis A1 extends, the compression coil spring 133 biases the tilting member 132 in a direction the wiper arm 104a moves toward the wiping surface (clockwise direction in FIG. 17A). As shown in FIG. 17B, when the biasing force Fb from the supporting center Z of the compression coil spring 133 toward the fourth axis A4 of the auxiliary support member 141 is at the upper side of the line L extending through the supporting center Z of the compression coil spring 133 and the second axis A2 of the tilting member 132, that is, directed toward the upper side in the direction in which the first axis A1 extends, the compression coil spring 133 biases the tilting member 132 so that the wiper arm 104a moves to the upright position, that is, in a direction the wiper arm 104a moves away from the front window 3 (counterclockwise direction in FIG. 17B).

As shown in FIG. 17B, the swing member 131 includes a restriction portion 131j. The restriction portion 131j contacts the tilting member 132 at a tilt angle set in advance to restrict further tilting of the tilting member 132 when the wiper arm biasing mechanism F is in the upright biasing state that biases the wiper arm 104a to the upright position. The restriction portion 131j of the present embodiment is formed on the upper surface excluding the vertical through-hole 131a and the plate-like upper extending portion 131d at the base 131b. The inclination angle of the restriction portion 131j is set so that the restriction portion 131j contacts the lower surface of the tilting member 132 at an angle inclined by about 30° from a state (see FIG. 17A) in which the third axis A3 of the wiper fixing shaft 138 is parallel to the first axis A1 of the drive shaft 121.

The operation of the vehicle wiper device according to the second embodiment configured as above will now be described.

For example, when the motor 101 is driven, the output shaft 113 is rotated back and forth within an angular range of 220°, and the crank 122 is pivoted back and forth with the output shaft 113. Power is then transmitted from the crank 122 to the lever 123 through the rod 124 so that the wiper arm biasing mechanism F and the wiper 104 (wiper arm 104a) integrally pivots back and forth within the pivoting angular range of 90° with the drive shaft 121 of the lever 123 thus performing the wiping operation.

In this case, as shown in FIG. 17A, when the biasing force Fa from the supporting center Z of the compression coil spring 133 toward the fourth axis A4 of the auxiliary support member 141 is directed toward the lower side of the line L connecting the supporting center Z of the compression coil spring 133 and the second axis A2 of the tilting member 132 (i.e., state in which the fourth axis A4 is at the lower side of the line L), the compression coil spring 133 biases the tilting member 132 in the direction (clockwise direction in FIG. 17A) in which the wiper arm 104a moves toward the wiping surface. Thus, even if the wiper 104 moves vertically along the shape of the wiping surface, that is, in the direction orthogonal to the front window 3 when the wiper 104 (wiper arm 104a) is pivoted back and forth in the pivoting angular range of 90°, the fourth axis A4 is set to be maintained at the lower side of the line L, and the wiper 104 is appropriately pressed against the front window 3 to satisfactorily wipe the front window 3.

For example, when an operator or the like lifts the wiper 104 (wiper arm 104a) in the stopped state of the motor 101, this switches to the fourth axis A4 to a state located at the upper side of the line L, as shown in FIG. 17B, and the compression coil spring 133 biases the tilting member 132 so that the wiper arm 104a moves to the upright position (counterclockwise direction in FIG. 17B). The tilting member 132 then contacts the restriction portion 131j at the tilt angle set in advance and maintained in this state (upright position).

The second embodiment has the following advantages.

(16) The tilting member 132 is supported by the swing member 131, and the compression coil spring 133 is supported by the swing member 131 to apply biasing force to the tilting member 132. Thus, members for biasing the wiper arm 104a (wiper 104) are concentrated as the wiper arm biasing mechanism F. This obtains advantage (1) of the first embodiment.

(17) The wiper arm biasing mechanism F is configured to switch between the normal biasing state in which the tilting member 132 is tilted by the first tilt angle with respect to the swing member 131, and the upright biasing state in which the tilting member 132 is tilted by the second tilt angle with respect to the swing member 131. In the normal biasing state, the compression coil spring 133 biases the tilting member 132 so that the wiper arm 104a moves toward the front window 3. In the upright biasing state, the compression coil spring 133 biases the tilting member 132 so that the wiper arm 104a move to the upright position. Thus, the wiper arm biasing mechanism F (compression coil spring 133) has a so-called lock-back function. The wiper arm biasing mechanism F having the lock-back function is configured with a simple configuration using biasing force. This allows for reduction in the number of components, miniaturization, and the like.

(18) When the tilting member 132 reaches the tilt angle set in advance in the state the compression coil spring 133 biases the tilting member 132 so that the wiper arm 104a obtains the upright position, the restriction portion 131j of the swing member 131 contacts the tilting member 132. This restricts further tilting of the tilting member 132. Thus, the wiper arm biasing mechanism F (swing member 131) has a holding function, that is, a function of holding the upright position of the wiper arm 104a during the so-called lock-back. Thus, in contrast to when using during lock-back a separate member for holding the tilting member 132, that is, a member for receiving the biasing force of the compression coil spring 133, the reduction in the number of components, miniaturization, and the like are achieved.

(19) When the third axis A3 of the wiper fixing shaft 138 is parallel to the first axis A1 of the drive shaft 121, the wiper fixing shaft 138 is arranged so that the third axis A3 is located closer to the distal end (right side in FIG. 17A) of the wiper arm 104a than the first axis A1. Thus, the back end of the wiper arm 104a is suppressed from greatly projecting out toward the back side than the first axis A1 of the drive shaft 121. This decreases the space at the back side required when the wiper arm 104a is raised. Thus, for example, a hole 151a of a louver 151 (hole 151a of the louver 151 to which the wiper fixing shaft 138 is inserted) that separates the interior and the exterior of the vehicle becomes smaller.

(20) The wiper arm 104a is fixed to the wiper fixing shaft 138 so that the longitudinal direction X1 of the wiper arm 104a extends in the same direction as the longitudinal direction X2 of the wiper arm biasing mechanism F as viewed from the direction in which the first axis A1 of the drive shaft 121 extends. The biasing force of the wiper arm biasing mechanism thus effectively acts as the biasing force on the wiper arm 104a.

The first and second embodiments may be modified as below.

The position, shape, and the like of the restriction piece 24g of the first embodiment may be changed as long as the tilting member 24 is restricted from tilting greater than the tilt angle set in advance when the compression coil spring 25 is at the upright biasing state.

Figure 7A:
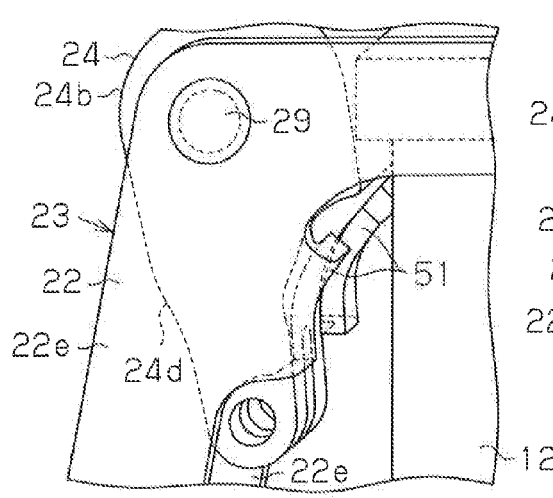
FIG. 7A is a partially enlarged perspective view showing a restriction piece in another example.
Figure 7B:
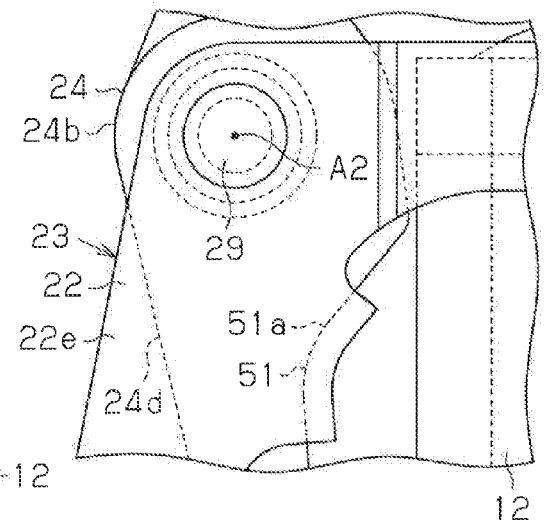
FIG. 7B is a partially enlarged side view of the restriction piece of FIG. 7A.

For example, the restriction piece may be modified as shown in FIGS. 7A and 7B. A restriction piece (restriction portion) 51 of this example is formed integrally with the swing member main body 22 of the swing member 23. The restriction piece 51 is formed toward the distal end of the pivot holder 12, that is, the end near the first axis A1 in the inclined extending part 22e of the swing member main body 22. The restriction piece 51 contacts an end surface near the pivot holder 12 of the lower extending portion 24d of the tilting member 24 to restrict further tilting of the tilting member 24 from that position. The restriction piece 51 is bent from the pair of inclined extending parts 22e, and is extended toward the inner side in the width direction so as to approach each other along the direction in which the second axis A2 extends. The restriction piece 51 is also formed to curve along the longitudinal direction as viewed from the direction in which the second axis A2 extends, and includes a restricting surface 51a serving as an end surface in the direction orthogonal to the longitudinal direction of the restriction piece 51. The entire surface of the restricting surface 51a contacts the tilting member 24 to restrict tilting of the tilting member 24.

Thus, by forming the restriction piece 51 so as to curve as viewed from the direction in which the second axis A2 extends, the deformation of the restriction piece 51 can be prevented as compared to when linearly forming the restriction piece, for example. The restriction piece 51 is thus less likely to collapse even when receiving the force from the tilting member 24. The upright angle of the wiper arm 31 may thus be stably maintained.

The restriction piece 51 also contacts the lower extending portion 24d extended from the tilting center portion 24b to restrict further tilting of the tilting member 24. In other words, the restriction piece 51 restricts the pivoting of the tilting member 24 at a position distant from the tilting center portion 24b. Thus, a large force is less likely to be applied to the restriction piece 51. Thus, the restriction piece 51 resists deformation. This also stably maintains the upright angle of the wiper arm 31.

Figure 8A:
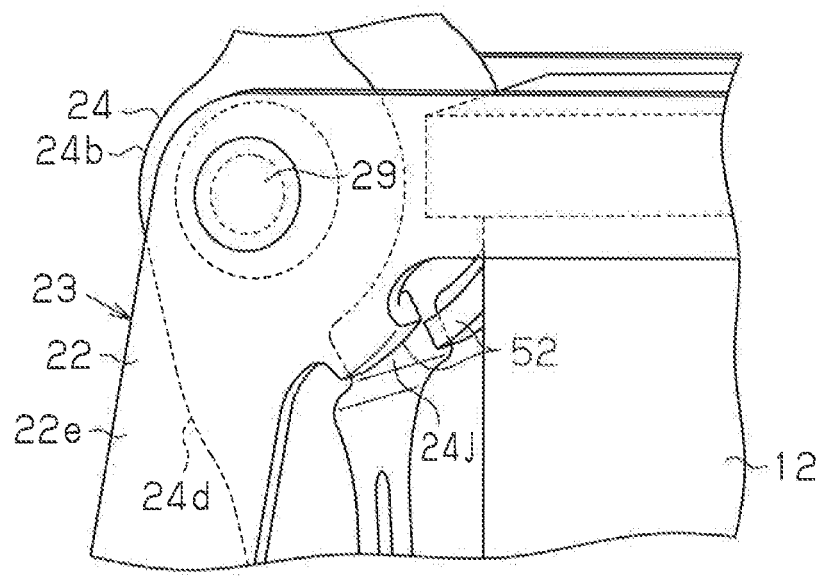
FIG. 8A is a partially enlarged perspective view showing a restriction piece in another example.
Figure 8B:
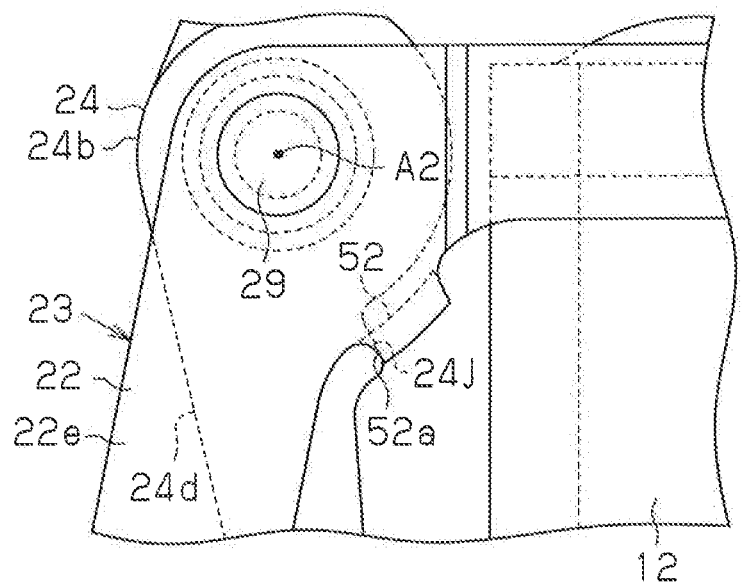
FIG. 8B is a partially enlarged side view of the restriction piece of FIG. 8A.

The restriction piece may, for example, be modified as shown in FIGS. 8A and 8B. The restriction piece (restriction portion) 52 of this example is integrally formed on the swing member main body 22 of the swing member 23. The restriction piece 52 is formed at an end near the pivot holder 12, that is, an end near the first axis A1 in the inclined extending part 22e of the swing member main body 22. The restriction piece 52 contacts an engagement projection 24j formed at the portion closer to the pivot holder 12 at the lower extending portion 24d of the tilting member 24 to restrict further tilting of the tilting member 24 from that position. The restriction piece 52 is bent from the pair of inclined extending parts 22e, and is extended toward the inner side in the width direction so as to approach each other along the direction in which the second axis A2 extends. The restriction piece 52 is formed to curve as viewed from the direction in which the second axis A2 extends, and includes a restricting surface 52a serving as an end surface in the longitudinal direction of the restriction piece 52. The restricting surface 52a contacts the engagement projection 24j of the tilting member 24 to restrict the tilting of the tilting member 24.

In other words, the restriction piece 52 is bent so that parts of the pair of inclined extending parts 22e approach each other, and the end surface in the longitudinal direction of the restriction piece 52 along the bent line is defined as the restricting surface 52a.

When the end surface in the longitudinal direction of the restriction piece 52 is the restricting surface 52a, the force received at the restricting surface 52a acts along the bent line of the restriction piece 52. Compared to a configuration in which the end surface in the direction orthogonal to the longitudinal direction is the restricting surface (configuration of receiving the force in the vicinity of the bent line as shown in FIG. 7), for example, the restriction piece 52 is less likely to collapse even when receiving the force from the tilting member 24. Thus, the upright angle of the wiper arm 31 more stably maintained. Furthermore, the restriction pieces 51, 52 do not contact an immovable configuration such as the pivot holder 12. The restriction pieces 51, 52 and the tilting member 24 that contact the restriction pieces 51, 52 are all configured by the wiper arm biasing mechanism F that pivots about the drive shaft 11. Thus, even if the wiper arm 31 is pivoted in the lock-back state, the restriction pieces 51, 52 and the tilting member 24 do not come into contact. This prevents the generation of noise and the like.

In the first embodiment and further example of the first embodiment, the pair of restriction pieces 24g, 51, 52 are arranged along the direction in which the second axis A2 extends but not limited in such a manner, and only one may be arranged. For example, the pair of restriction pieces 51 (52) may be connected to obtain one restriction piece.

The pivot support member 26 of the first embodiment may be in another form as long as it can support the first end of the compression coil spring 25 and it is pivotally arranged at the swing member.

For example, the pivot support member 26 may be modified as shown in FIGS. 9A and 9B. A swing member main body 61 in the swing member 23 of this example includes a pair of parallel plate-like arm portions 61a (only the one above the plane of the drawing is illustrated in FIGS. 9A and 9B). The basal ends of the pair of arm portions 62a of the pivot support member 62 are pivotally coupled to the distal ends (lower ends) of the pair of arm portions 61a, respectively. A bottom portion 62b that couples the distal ends (lower ends) of the pair of arm portions 62a supports the compression coil spring 25. In FIGS. 9A and 9B, the compression coil spring 25 is schematically shown. This obtains the same advantages as the first embodiment.

The clearance portion 24i of the first embodiment may have a different shape as long as the pivot path range of the intermediate portion 24h can be decreased.

Figure 10:
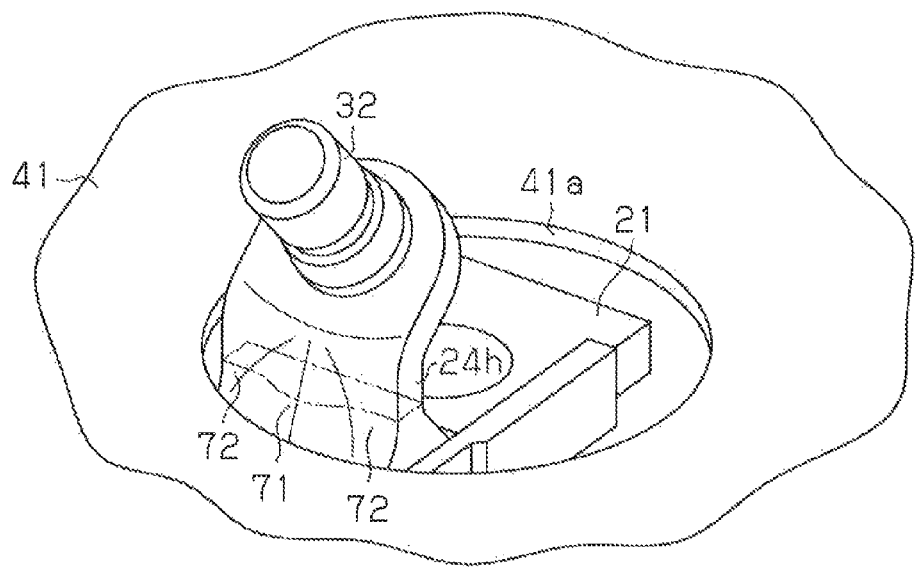
FIGS. 10 and 11 are partially enlarged perspective views showing a wiper arm biasing mechanism of another example in the upright biasing state.

For example, the clearance portion may be modified as shown in FIG. 10. In this example, a projection 71 is formed at a central part in the circumferential direction of the radially outer side surface of the intermediate portion 24h. Thus, a clearance portion 72 is formed at an end in the circumferential direction on the radially outer side surface of the intermediate portion 24h. In FIG. 10, the cross-section of the intermediate portion 24h at the position corresponding to the clearance portion 72 when the compression coil spring 25 is in the upright biasing state is shown by a double-dashed line. According to such configuration as well, the pivot path range of the intermediate portion 24h can be decreased. Hence, interference of the tilting member 24 and the outlet hole 41a of the louver 41 can be prevented while maintaining high rigidity of the intermediate portion 24h.

Figure 11:
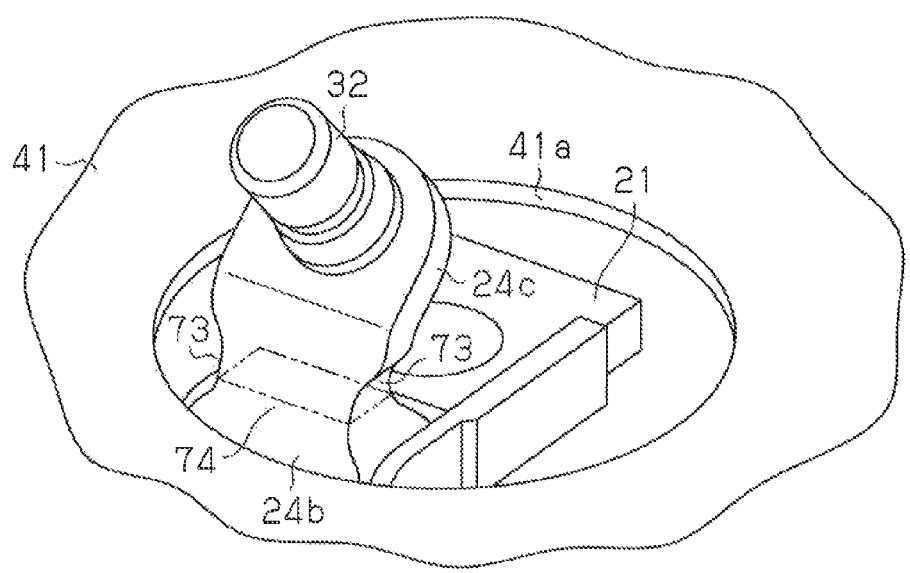

For example, the clearance portion 24i may be modified as shown in FIG. 11. In this example the intermediate portion 74 located between the tilting center portion 24b and the wiper fixing shaft 32 (distal end of upper extending portion 24c) is formed to have a locally narrow width in the circumferential direction, so that the clearance portion 73 is formed at the end in the circumferential direction of the intermediate portion 74. In FIG. 11, the cross-section of the intermediate portion 74 at the position corresponding the clearance portion 73 when the compression coil spring 25 is in the upright biasing state is shown with a double-dashed line. The pivot path range of the intermediate portion 24h can be made smaller while ensuring the width in the circumferential direction of the portion of the tilting member 24 other than the clearance portion 73 (tilting center portion 24b and the distal end side of the upper extending portion 24c). Thus, the interference of the intermediate portion 74 and the louver 41 at the position corresponding to the outlet hole 41a can be prevented.

In the first embodiment, the pivot support member 26 for supporting the first end of the compression coil spring 25 is pivotally arranged on the swing member 23, but is not limited in such a manner. For example, the pivot support member 26 may be omitted, and the accommodation hole 22g does not have to be formed in the arm coupling portion 22b of the swing member 23. Instead, the swing member 23 may be configured so that the arm coupling portion 22b directly supports the first end of the compression coil spring 25.

In the first embodiment, the line (line along the biasing force Fa, Fb) extending through the center of each end of the compression coil spring 25 forms an angle of 45° or less with the first axis A1 of the drive shaft 11. There is no such limitation, and the line along the biasing force Fa, Fb may form an angle of 45° or greater with the first axis A1.

In the first embodiment, the wiper arm biasing mechanism F is configured so that the tilting member 24 is supported by the swing member 23. For example, the wiper arm biasing mechanism may be changed to a configuration in which the swing member 23 is arranged at the lower end of the drive shaft 11 and the tilting member 24 is pivotally supported at the upper end of the drive shaft 11.

In the first embodiment (second embodiment), the compression coil spring 25 (133) is switched to either a state of biasing to move the wiper arm 31 (104a) toward the wiping surface or to a state of biasing so that the wiper arm 31 (103a) moves to the upright position in accordance with the tilt angle of the tilting member 24 (132). For example, the wiper arm biasing mechanism F may be configured so that the compression coil spring (biasing member) biases only in the direction the wiper arm 31 (104a) moves toward the wiping surface.

In the first embodiment, the tilting member 24 is configured so that the clearance portion 24i is formed in the intermediate portion 24h. The tilting member 24 may be changed to a shape in which the clearance portion 24i is not formed.

In the first embodiment, the wiper arm biasing mechanism F is configured so that the first axis A1 of the drive shaft 11 shifts with respect to the sixth axis A6 of the outlet hole 41a of the louver 41. There is no such limitation, and the wiper arm biasing mechanism F may be configured so that the first axis A1 conforms to the sixth axis A6.

In the first embodiment, the tilting member 24 includes the restriction piece 24g. For example, another portion such as the wiper arm 31, or the like may include a mechanism (restriction portion) for determining the upright angle of the wiper arm 31.

In the first embodiment, each member (swing member 23, tilting member 24, and compression coil spring 25) configuring the wiper arm biasing mechanism F is arranged at a portion of the vehicle on the opposite side of the distal end of the wiper arm 31 with respect to the wiper fixing shaft 32. There is no such limitation, and at least one member may be arranged on the same side as the distal end of the wiper arm 31 with respect to the wiper fixing shaft 32.

In the first embodiment, the compression coil spring 25 is used for the biasing member. A wiper biasing member that switches to either the normal biasing state or the upright biasing state using a helical extension spring may be configured for the biasing member.

In the first embodiment, each member excluding the wiper fixing shaft 32 among the members configuring the wiper arm biasing mechanism F is arranged at the lower side of the wiper fixing shaft 32. At least some of the members may be arranged at a position of the same height as the wiper fixing shaft 32 or a position higher than the wiper fixing shaft 32.

In the first embodiment, the first axis A1 of the drive shaft 11 and the second axis A2 of the tilting member 24 are in a skew-line relationship, but may be in an orthogonal (intersecting) position relationship.

In the first embodiment, the compression coil spring 25 is used for the biasing member, but other compression springs may be used such as a volute spring in which a plate-like spring material is wound into a conical shape may be used in a compressed manner.

In the first embodiment, the basal end (lower end) of the drive shaft 11 is coupled to the output shaft of the link mechanism 2, but the drive shaft 11 and the output shaft of the link mechanism 2 may be an integrated member.

In the first embodiment, the drive device K is arranged at each portion of the vehicle located at the lower side of both ends in the vehicle width direction of the front window 3. When the wipers 4 are at the stopped position, the wipers 4 are arranged to overlap each other in the wiping direction. The vehicle wiper device is not limited in such a manner, and may be changed to a different type. For example, the invention of the present application may be applied and embodied in a so-called tandem type vehicle wiper device in which one wiper 4 and another wiper 4 swing back and forth in the same direction to wipe the front window 3.

In the first embodiment, the pivot holder 12 is formed integrally with the link case (not shown) for accommodating the link mechanism 2, and the pivot holder 12 is also fixed to the vehicle body by fixing the drive device K to the vehicle body. There is no such limitation, and the pivot holder 12 may be formed as a body separate from the link case and fixed to the vehicle body separately from the drive device K.

In the second embodiment, the swing member 131 includes the restriction portion 131*j* that contacts the tilting member 132 at the tilt angle set in advance to restrict further tilting. There is no such limitation, and for example, the swing member 131 may not include the restricted portion 131*j*. Needless to say, the tilt angle restricted by the restriction portion 131*j* may be changed.

In the second embodiment, when the third axis A3 of the wiper fixing shaft 138 is parallel to the first axis A1 of the drive shaft 121, the wiper fixing shaft 138 is arranged so that the third axis A3 is located closer to the distal end (right side in FIG. 17A) of the wiper arm 104*a* than the first axis A1. There is no such limitation, and for example, the wiper fixing shaft 138 may be arranged so that the third axis A3 conforms to the first axis A1. The wiper fixing shaft 138 may be a circular cone-shaped shaft as long as the basal end of the wiper arm 104*a* can be fixed, and for example, may be changed to other wiper fixing portions such as a fixing piece, or the like. The wiper fixing portion may be integrally formed with the tilting member 132.

In the second embodiment, the first axis A1 of the drive shaft 121 is orthogonal (intersect) with the second axis A2 of the tilting member 132. There is no such limitation, and the first axis A1 and the second axis A2 do not have to intersect each other and may be in a skew-line relationship and perpendicular to each other (form 90° with each other). The first axis A1 and the second axis A2 may be in a position relationship inclined with respect to each other without being perpendicular to each other (without forming 90° with each other).

In the second embodiment, the wiper arm biasing mechanism F includes the auxiliary support member 141. There is no such limitation, and for example, the auxiliary support member 141 may use other configurations or may be omitted as long as the biasing member (compression coil spring 133) functions in the same manner. The configuration (plate-like supporting wall 131*g*, inclined projection 131*i*, etc.) of having the swing member 131 support the biasing member (compression coil spring 133) may be changed to another configuration as long as it functions in the same manner.

In the second embodiment, the drive device K is arranged at each portion of the vehicle located at the lower side of both ends in the vehicle width direction of the front window 3. When the wiper 104 is at the stopped position, the wipers 104 are arranged to overlap each other in the wiping direction. There is no such limitation, and the vehicle wiper device may be configured so that the two wipers 104 do not overlap each other in the wiping direction when the wipers 104 are at the stopped position.

In the second embodiment, the drive device K includes the motor 101 and the link mechanism 102. There is no such limitation, and the drive device K may be configured not to include the link mechanism 102 and so that the motor 101 directly drives the drive shaft, that is, the output shaft 113 functions as the drive shaft.

In the first embodiment, the two wipers 4 are pivoted by different motors 1. The pair of wipers 4 may be pivoted by one motor 1 at a position spaced apart from the wiper arm biasing mechanism F. In this case, the link mechanism is configured as shown in FIGS. 12A and 12B, for example. The first end of the lever 13 is coupled to the drive shaft 11 through a rivet 14, and the second end of the lever 13 is coupled to the motor 1 at the position spaced apart from the wiper arm biasing mechanism F through the ball pin 15 and the link rod 16. According to such configuration as well, the lever 13 extends so that the second end of the lever 13 is located at a portion of the vehicle on the opposite side of the wiper arm biasing mechanism F with respect to the drive shaft 11. Thus, the advantage (15) described above can be obtained. Although only one of the pair of wiper arm biasing mechanisms F is shown in FIGS. 12A and 12B, another wiper arm biasing mechanism is also configured in the same manner. The two wipers 4 may respectively be pivoted by two motors 1 at positions spaced apart from the wiper arm biasing mechanism F.

Figure 13:
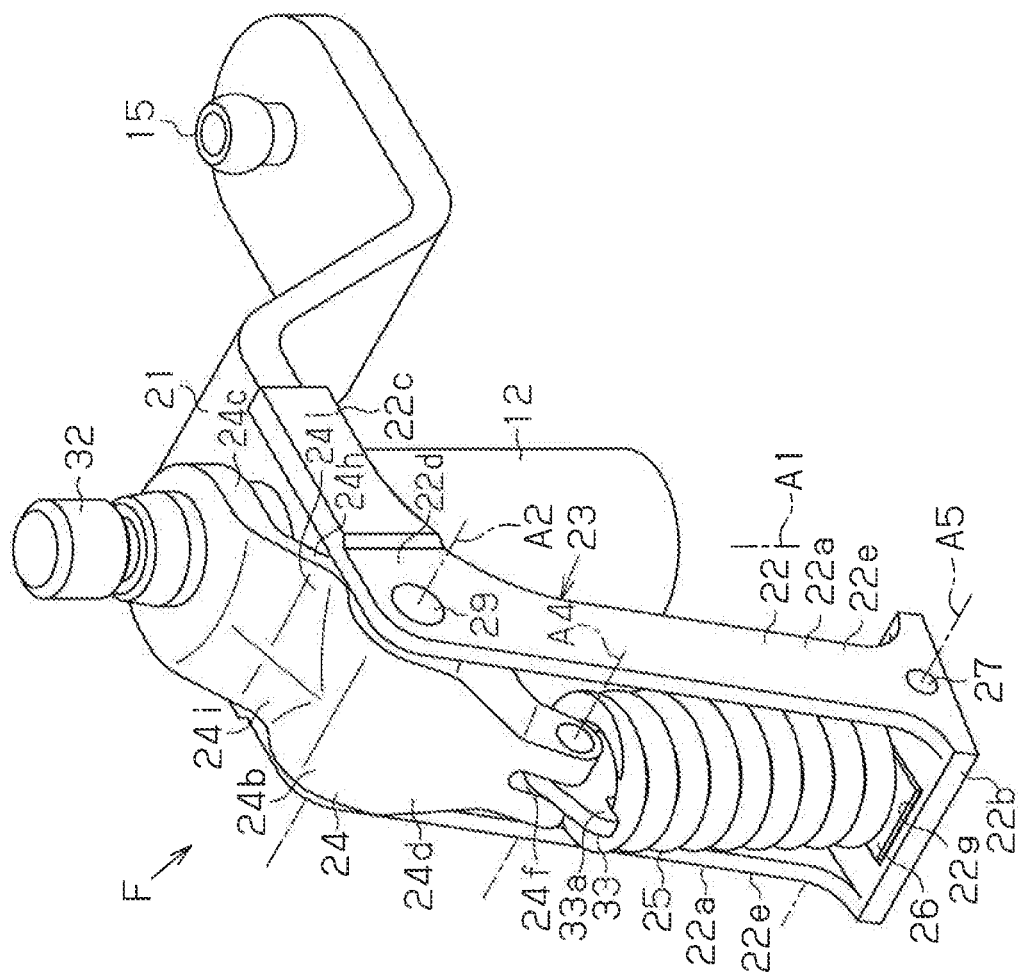
FIG. 13 is a perspective view showing another example of the wiper arm biasing mechanism of FIG. 12A.

In the configuration shown in FIG. 12A, the first end of the lever 13 is fixed to the lower end of the drive shaft 11, and the swing base member 21 is fixed to the upper end of the drive shaft 11. There is no such limitation, and the lever 13 and the swing base member 21 may be integrally formed. Specifically, as shown in FIG. 13, the portion of the swing base member 21 fixed to the upper end of the drive shaft 11 is extended to the lower side, and the portion extended to the lower side is further extended toward the radially outer side of the drive shaft 11 (first axis A1). A member in which the lever 13 and the swing base member 21 are integrated is thereby bent. According to such configuration, the number of components and the number of assembly steps of the wiper arm biasing member F are reduced.

In the second embodiment as well, the pair of wipers 104 may be pivoted by one motor 101 at a position spaced apart from the wiper arm biasing mechanism F.

The invention claimed is:

1. A vehicle wiper device comprising:
   a drive device;
   a drive shaft rotated back and forth about a first axis by the drive device;
   a holder member that pivotally supports the drive shaft;
   a wiper arm that pivots back and forth along a wiping surface as the drive shaft rotates back and forth; and
   a wiper arm biasing mechanism that is arranged on the drive shaft and biases the wiper arm toward the wiping surface, wherein the wiper arm biasing mechanism includes a swing member that is integrally pivotal with the drive shaft, a tilting member that is pivotally mounted on the swing member to tilt about a second axis, which intersects the first axis or is in a skew-line relationship with the first axis, wherein the tilting member includes a wiper fixing portion to which the wiper arm is fixed, and an elongated biasing member defining opposed first and second ends, the first end supported on the swing member and the second end supported by the tilting member, wherein the biasing member applies a biasing force between and to the swing member and the tilting member.

2. The vehicle wiper device according to claim 1, wherein the wiper arm biasing mechanism is configured to switch between a first state, in which the tilting member is tilted by a first tilt angle with respect to the swing member, and a second state, in which the tilting member is tilted by a second tilt angle with respect to the swing member;

the biasing member biases the tilting member so that the wiper arm moves toward the wiping surface in the first state; and the biasing member biases the tilting member so that the wiper arm is moved to an upright position in the second state.

3. The vehicle wiper device according to claim 2, wherein at least one of the swing member and the tilting member includes a restriction portion that restricts tilting of the tilting member beyond the second tilt angle when the wiper arm biasing mechanism is in the second state.

4. The vehicle wiper device according to claim 3, wherein the restriction portion is formed to extend along a direction in which the second axis extends; and the restriction portion includes a restricting surface serving as an end surface in a longitudinal direction of the restriction portion as viewed from the direction in which the second axis extends, and the restricting surface restricts tilting of the tilting member beyond the second tilt angle.

5. The vehicle wiper device according to claim 3, wherein the tilting member includes a tilting center portion, tiltable about the second axis, and an extending portion, extending from the tilting center portion, wherein the extending portion includes a distal end having a biased portion to which the biasing force from the biasing member is applied; and the restriction portion restricts further tilting of the tilting member by contacting the extending portion.

6. The vehicle wiper device according to claim 3, wherein the restriction portion is one of a pair of restriction portions arranged along a direction in which the second axis extends.

7. The vehicle wiper device according to claim 1, wherein the wiper arm is fixed to the wiper fixing portion so that a longitudinal direction of the wiper arm extends in the same direction as a longitudinal direction of the wiper arm biasing mechanism as viewed from a direction in which the first axis extends.

8. The vehicle wiper device according to claim 1, wherein the wiper arm includes a basal end fixed to the wiper fixing portion and a distal end at an opposite side of the basal end; and the swing member, the tilting member, and the biasing member are arranged at a portion of a vehicle on an opposite side of the distal end of the wiper arm with respect to the wiper fixing portion.

9. The vehicle wiper device according to claim 1, wherein the wiper arm biasing mechanism is configured so that a line extending through a center of the first end and a center of the second end of the biasing member forms an angle of 45.degree. or less with the first axis as viewed from a direction in which the second axis extends.

10. The vehicle wiper device according to claim 1, wherein the wiper fixing portion is arranged so that a third axis of the wiper fixing portion is located closer to a distal end of the wiper arm than the first axis when the third axis is parallel to the first axis.

11. A vehicle wiper device comprising:
a drive device;
a drive shaft rotated back and forth about a first axis by the drive device;
a wiper arm that pivots back and forth along a wiping surface as the drive shaft rotates back and forth;
a wiper arm biasing mechanism that biases the wiper arm toward the wiping surface; and
a lever including a first end fixed to the drive shaft and a second end to which a drive force from the drive device is input, wherein:
the wiper arm biasing mechanism includes
a swing member that is integrally pivotal with the drive shaft,
a tilting member that is supported by the swing member to tilt about a second axis, which intersects the first axis or is in a skew-line relationship with the first axis, wherein the tilting member includes a wiper fixing portion to which the wiper arm is fixed, and
a biasing member including a first end supported by the swing member and a second end at an opposite side of the first end, wherein the biasing member applies a biasing force to the tilting member
the biasing member resides on an opposite side of the drive shaft with respect to the second end of the lever.

12. The vehicle wiper device according to claim 11, wherein
the wiper arm biasing mechanism is configured to switch between a first state, in which the tilting member is tilted by a first tilt angle with respect to the swing member, and a second state, in which the tilting member is tilted by a second tilt angle with respect to the swing member;
the biasing member biases the tilting member so that the wiper arm moves toward the wiping surface in the first state; and
the biasing member biases the tilting member so that the wiper arm is moved to an upright position in the second state.

13. The vehicle wiper device according to claim 12, wherein at least one of the swing member and the tilting member includes a restriction portion that restricts tilting of the tilting member beyond the second tilt angle when the wiper arm biasing mechanism is in the second state.

14. The vehicle wiper device according to claim 13, wherein
the restriction portion is formed to extend along a direction in which the second axis extends; and the restriction portion includes a restricting surface serving as an end surface in a longitudinal direction of the restriction portion as viewed from the direction in which the second axis extends, and the restricting surface restricts tilting of the tilting member beyond the second tilt angle.

15. The vehicle wiper device according to claim 13, wherein
the tilting member includes a tilting center portion, tiltable about the second axis, and an extending portion, extending from the tilting center portion, wherein the extending portion includes a distal end having a biased portion to which the biasing force from the biasing member is applied; and the restriction portion restricts further tilting of the tilting member by contacting the extending portion.

16. The vehicle wiper device according to claim 13, wherein the restriction portion is one of a pair of restriction portions arranged along a direction in which the second axis extends.

17. The vehicle wiper device according to claim 11, wherein the wiper arm is fixed to the wiper fixing portion so that a longitudinal direction of the wiper arm extends in the same direction as a longitudinal direction of the wiper arm biasing mechanism as viewed from a direction in which the first axis extends.

18. The vehicle wiper device according to claim 11, wherein
- the wiper arm includes a basal end fixed to the wiper fixing portion and a distal end at an opposite side of the basal end; and
- the swing member, the tilting member, and the biasing member are arranged at a portion of a vehicle on an opposite side of the distal end of the wiper arm with respect to the wiper fixing portion.

19. The vehicle wiper device according to claim 11, wherein the wiper arm biasing mechanism is configured so that a line extending through a center of the first end and a center of the second end of the biasing member forms an angle of 45° or less with the first axis as viewed from a direction in which the second axis extends.

20. The vehicle wiper device according to claim 11, wherein the wiper fixing portion is arranged so that a third axis of the wiper fixing portion is located closer to a distal end of the wiper arm than the first axis when the third axis is parallel to the first axis.

* * * * *